(12) United States Patent
Kim et al.

(10) Patent No.: US 8,855,091 B2
(45) Date of Patent: *Oct. 7, 2014

(54) METHOD FOR DETERMINING ISR DEACTIVATION IN MOBILE COMMUNICATIONS SYSTEM

(75) Inventors: Laeyoung Kim, Gyeonggi-Do (KR); Hyunsook Kim, Gyeonggi-Do (KR); Taehyeon Kim, Gyeonggi-Do (KR); Saso Stojanovski, Paris (FR); Arnaud Vedrine, Paris (FR)

(73) Assignee: LG Electronics Inc., Seoul (KR)

( * ) Notice: Subject to any disclaimer, the term of this patent is extended or adjusted under 35 U.S.C. 154(b) by 288 days.

This patent is subject to a terminal disclaimer.

(21) Appl. No.: 13/501,744

(22) PCT Filed: Dec. 27, 2010

(86) PCT No.: PCT/KR2010/009373
§ 371 (c)(1),
(2), (4) Date: Jun. 12, 2012

(87) PCT Pub. No.: WO2011/081384
PCT Pub. Date: Jul. 7, 2011

(65) Prior Publication Data
US 2012/0258704 A1    Oct. 11, 2012

Related U.S. Application Data

(60) Provisional application No. 61/290,501, filed on Dec. 29, 2009, provisional application No. 61/290,499, filed on Dec. 29, 2009.

(30) Foreign Application Priority Data

May 11, 2010 (KR) .................. 10-2010-0044168
Jun. 15, 2010 (KR) .................. 10-2010-0056736

(51) Int. Cl.
*H04W 4/00* (2009.01)
*H04W 52/02* (2009.01)

(52) U.S. Cl.
CPC ...................... *H04W 52/0235* (2013.01); *Y02B 60/50* (2013.01)
USPC .................................................. 370/338

(58) Field of Classification Search
None
See application file for complete search history.

(56) References Cited

U.S. PATENT DOCUMENTS

2010/0064038 A1*   3/2010   Hu ............................ 709/223
2010/0317315 A1   12/2010   Burbidge et al.

(Continued)

FOREIGN PATENT DOCUMENTS

WO    2009/097734    8/2009
WO    2009/097772    8/2009

*Primary Examiner* — Gregory Sefcheck
*Assistant Examiner* — Amar Persaud
(74) *Attorney, Agent, or Firm* — Lee, Hong, Degerman, Kang & Waimey

(57) ABSTRACT

The present invention relates to a mobile communications system, and particularly, to a method for determining whether to keep or deactivate an activated Idle mode Signaling Reduction (ISR) feature for a terminal in a mobile communications system. In case of the UE's intra-SGSN mobility and intra-MME mobility, when deciding, by a mobility management node, ISR activation for a UE in an IMS network environment where heterogeneous mobile communications networks (e.g., E-UTRAN and UTRAN/GERAN) interwork with each other, considered are not only whether the mobility management node can support an ISR feature, and whether the UE can use IMS voice, but also conditions (information) on whether each mobility management can support IMS voice over PS session. This may allow an incoming voice call to the UE from the IMS network to be delivered through a first trial, to a domain (PS domain or CS domain) selected with consideration of access network situations.

11 Claims, 10 Drawing Sheets

(56) References Cited

U.S. PATENT DOCUMENTS

2011/0116449 A1\* 5/2011 Hu et al. .................. 370/328
2012/0142349 A1\* 6/2012 Guo et al. .................. 455/435.1
2013/0115978 A1\* 5/2013 Guo et al. .................. 455/458

\* cited by examiner

METHOD FOR DETERMINING ISR DEACTIVATION IN MOBILE COMMUNICATIONS SYSTEM

CROSS-REFERENCE TO RELATED APPLICATIONS

This application is the National Stage filing under 35 U.S.C. 371 of International Application No. PCT/KR2010/009373, filed on Dec. 27, 2010, which claims the benefit of earlier filing date and right of priority to Korean Application Nos. 10-2010-0056736, filed on Jun. 15, 2010, and 10-2010-0044168, filed on May 11, 2010, and also claims the benefit of U.S. Provisional Application Ser. Nos. 61/290,501, filed on Dec. 29, 2009, and 61/290,499, filed on Dec. 29, 2009, the contents of which are all incorporated by reference herein in their entirety.

TECHNICAL FIELD

The present invention relates to a mobile communications system, and particularly, to a method for determining whether to keep or deactivate an activated Idle mode Signaling Reduction (ISR) feature for a terminal in a mobile communications system.

BACKGROUND ART

Generally, the 3rd Generation Partnership Project (3GPP) for regulating technical standardizations of the third generation mobile communications system has been researching for LTE/SAE (Long Term Evolution/System Architecture Evolution) since the end of 2004 for an enhanced and optimized performance, in correspondence to several forums and new technologies relating to the 4th generation mobile communications system. The SAE developed mainly by 3GPP SA WG2 relates to a network technology for determining an architecture of a network and supporting mobility between heterogeneous access networks together with LTE of 3GPP TSG RAN. The SAE, one of important standardization issues is to develop the 3GPP system into an IP-based system for supporting various radio access technologies. For an optimized packet-based system with minimized transfer delay by an enhanced data transfer capability, research has been executed.

FIG. 1 is a configuration view of an Idle mode Signaling Reduction (ISR) service. FIG. 1 illustrates a routing area, tracking areas, and an ISR area.

Hereinafter, the technical terms used in the present invention will be explained with reference to FIG. 1.

TA (tracking area) indicates an area to which E-UTRAN provides a service, and includes one or more E-UTRAN cells. RA (routing area) indicates an area to which GERAN or UTRAN provides a service, and includes one or more GERAN/UTRAN cells.

TAI (Tracking Area Identity) list indicates a list of TAIs that identify the tracking areas (e.g., TA1, TA2, TA3, TA4 and TA5 in FIG. 1) that a UE can enter without performing a tracking area updating procedure. The TAI list has been defined in 3GPP TS 24.301 v9.1.0, and thus detailed explanations thereof will be omitted.

MME (Mobility Management Entity) area indicates a part of a network served by an MME. The MME area consists of one or several Tracking Areas. All cells served by one eNodeB are included in one MME Area. The MME area has been defined in 3GPP TS 23.002 v9.2.0, and thus detailed explanations thereof will be omitted.

Cell "camping on" (Camped on a cell) indicates that a UE has completed a cell selection/reselection process and has chosen a cell. The cell camping on has been defined in 3GPP TS 36.304 v9.1.0, and thus detailed explanations thereof will be omitted.

ISR (Idle mode Signaling Reduction) indicates a service to enhance efficiency of network resources by reducing signaling for location registration (location update) when the UE moves between different access networks such as E-UTRAN and UTRAN/GERAN. Referring to FIG. 1, the ISR will be explained in more detail. When the UE camps on the E-UTRAN cell, the UE performs location registration on the MME. On the other hand, when the UE moves to the UTRAN/GERAN cell and camps on that cell, the UE performs location registration on the SGSN. Therefore, when the UE frequently moves between the E-UTRAN and the UTRAN/GERAN, network resources may be wasted due to frequent location registration procedures. In order to reduce the waste of network resources, an ISR method has been proposed. According to the ISR method, once the UE respectively performs location registration on the MME and the SGSN (two mobility management nodes) via the E-UTRAN and the UTRAN/GERAN, the UE in an idle mode does not perform an additional location registration when moving between two pre-registered Radio Access Technologies (RATs), or when reselecting a cell. If there is downlink (DL) data that should be sent to a corresponding UE in an ISR activated state and an idle mode, paging is simultaneously delivered to the E-UTRAN and the UTRAN/GERAN. This allows the network to successfully search for the UE and to deliver the DL data to the UE. The ISR has been defined in 3GPP TS 23.401 v9.3.0 and 3GPP TS 23.060 v9.3.0, and thus detailed explanations thereof will be omitted.

ICS (IMS Centralized Services) stably provides consistent services based on IMS to the UE regardless of an access network to which the UE has attached (i.e., when the UE has attached not only to IP-CAN but also to a CS domain). The ICS has been defined in 3GPP TS 23.292 v9.4.0, and thus detailed explanations thereof will be omitted.

IMS (IP Multimedia Subsystem) indicates a system for providing a multimedia service based on an IP.

AS (Application Server) indicates a server for providing various multimedia services.

SCC AS (Service Centralization and Continuity Application Server) indicates an application server for supporting continuity of a multimedia session. The SCC AS has been defined in 3GPP TS 23.292 v9.4.0 and 3GPP TS 23.237 v9.3.0, and thus detailed explanations thereof will be omitted.

CSFB (Circuit Switched FallBack) indicates technique for providing voice and other CS domain services by making the UE which is in an E-UTRAN accessed state fallback to a UTRAN/GERAN CS domain accessed state. The CSFB has been defined in 3GPP TS 23.272 v9.2.0, and thus detailed explanations thereof will be omitted.

Intra-SGSN mobility: The UE camping on the UTRAN or GERAN moves to a new

UTRAN or GERAN which belongs to a Routing Area (RA) different from the routing area on which the UE previously performed location registration. Here, since the previously location-registered RA and the new RA are served by the same SGSN, the UE performs location registration on the same SGSN. Referring to FIG. 2, the intra-SGSN mobility will be explained. In FIG. 2, it is assumed that the UE has performed location registration on the SGSN in the RA1, and then has moved to the RA2. Once entering the new RA (RA2), the UE performs location registration on the SGSN. This is called as 'intra-SGSN mobility'.

Intra-MME mobility: The UE camping on the E-UTRAN moves to a new E-UTRAN. A tracking area (TA) to which the new E-UTRAN cell belongs is served by the MME on which the UE previously performed location registration. However, the TA is not included in a TAI list received from the MME when the UE previously performed location registration on the MME. Accordingly, the UE performs location registration on the same MME. Referring to FIG. 3, the intra-MME mobility will be explained. The UE has performed location registration on the MME in the TA3, and then moves to the TA4. In this case, the TA4 is not included in a TAI list (TAI list 1) received from the MME. Accordingly, the UE performs location registration on the MME, which is called as 'intra-MME mobility'.

Hereinafter, the present invention will be explained in more detail with reference to the aforementioned technical terms.

FIG. 4 is a signal flowchart showing ISR activation in a network in accordance with the conventional art. Referring to FIG. 4, once the UE 10 initially camping on the E-UTRAN cell moves to the GERAN or UTRAN cell (S4-5), the UE 10 camps on the GERAN or UTRAN cell.

FIG. 4 illustrates procedures (S4-1~S4-4) to attach to the MME 20 by the UE 10 currently camping on the E-UTRAN, a procedure (S4-5) to reselect the GERAN or UTRAN as the UE 10 moves, routing area update procedures (S4-6~S4-13) with respect to the GERAN or UTRAN on which the UE camps on, and a procedure (S4-14) to reselect the E-UTRAN by the UE 10 as the UE 10 moves back to the E-UTRAN cell.

Hereinafter, an ISR activation process will be explained in more detail with reference to FIG. 4.

Once the UE 10 initially camps on the E-UTRAN cell, the UE 10 sends an Attach Request message to the MME 20 for location registration on the HSS 40 through the MME 20 via the eNodeB 21 (S4-1). The MME 20 sends an Update Location Request message to the HSS 40 so as to inform the UE's attachment (S4-2).

The HSS 40 stores an identity (ID) of the MME 20 to which the UE 10 has attached, and sends an Update Location Ack message including the UE's subscriber information to the MME 20 (S4-3). The MME 20 sends an Attach Accept message to the UE 10 via the eNodeB 21 (S4-4). Through S4-1~S4-4, the UE 10 completes to attach to the MME 20 which serves the currently camped E-UTRAN cell, and registers the UE's location on the HSS 40.

Then, the UE 10 moves to a coverage area of the GERAN or UTRAN cell, thereby reselecting the GERAN or UTRAN cell (S4-5). This requires for the UE 10 to perform Routing Area Update on the GERAN or UTRAN cell for location registration (S4-6 S4-13).

More concretely, the UE 10 sends a Routing Area Update Request message to the SGSN 30 so as to perform location registration on the HSS 40 through the SGSN 30 via the RNC/BSC 31 (S4-6). Through the Routing Area Update Request message, the SGSN 30 can recognize that the UE 10 has performed location registration on the MME 20 in the previous steps (S4-1~S4-4). The SGSN 30 sends a Context Request message to the MME 20 so as to receive context information on the UE 10 from the MME 20 on which location registration has been performed through S4-1~S4-4 (S4-7).

As a response to the Context Request message sent from the SGSN 30, the MME 20 sends a Context Response message including context information on the UE 10 to the SGSN 30 (S4-8). Here, the MME 20 includes an 'ISR Supported' parameter in the Context Response message so as to inform the SGSN 30 that the MME 20 can support an ISR feature. The UE's context information included in the Context Response message includes MM (Mobility Management) Context information, and EPS PDN Connections information. Here, the EPS PDN Connections information includes Bearer Context information. The MME 20 constitutes context information on the UE 10 which is to be included in the Context Response message, based on the MM context information and EPS bearer context information. The MM context information and the EPS bearer context information maintained by the MME have been defined in clause 5.7.2 (MME) of 3GPP TS 23.401 v9.3.0, and thus detailed explanations thereof will be omitted.

The SGSN 30 decides whether it activates an ISR feature for the UE 10 (S4-9). More concretely, the SGSN 30 can recognize that the MME 20 supports an ISR feature by analyzing the 'ISR Supported' parameter included in the Context Response message received from the MME 20. Since the SGSN 30 also supports an ISR feature, the SGSN 30 decides to activate an ISR feature.

Since both of the MME 20 and the SGSN 30 support an ISR feature, in S4-9, the SGSN 30 decides for ISR activation. As a response to the Context Response message sent from the MME 20, the SGSN 30 sends a Context Ack message to the MME 20 (S4-10). Here, the SGSN 30 informs the MME 20 that an ISR feature for the UE 10 has been activated, by including an 'ISR Activated' parameter in the Context Ack message.

Once the ISR feature has been activated, the SGSN 30 and the MME 20 store each mutual identity (ID). And, the MME 20 having received the Context Ack message including the 'ISR Activated' parameter from the SGSN 30 continuously keeps (maintains) the context information on the UE 10.

The Context Request message of S4-7, the Context Response message of S4-8, and the Context Ack message of S4-10 have been defined in clause 7.3.5 (Context Request), 7.3.6 (Context Response) and 7.3.7 (Context Acknowledge) of 3GPP TS 29.274 v9.1.0, and thus detailed explanations thereof will be omitted.

The SGSN 30 sends an Update Location Request message to the HSS 40 so as to inform the UE's location registration (S4-11). And, the HSS 40 stores an identity (ID) of the SGSN 30 on which the UE 10 has performed Routing Area Update, and sends an Update Location Ack message including the UE's subscriber information to the SGSN 30 (S4-12).

The SGSN 30 sends a Routing Area Update Accept message to the UE 10 through the RNC/BSC 31 (S4-13). Here, the SGSN 30 informs the UE 10 ISR activation by including the 'ISR Activated' parameter in the Routing Area Update Accept message.

Through the attach procedures (S4-1~S4-4) and the routing area update procedures (S4-6~S4-13), the UE has performed location registration, and ISR activation has been performed since both of the MME 20 and the SGSN 30 support an ISR feature.

Thereafter, even if the E-UTRAN is reselected as the UE 10 moves to the E-UTRAN from the GERAN or UTRAN (S4-14), the UE 10 does not have to perform location registration on the MME 20 since an ISR feature has been activated.

More concretely, after the ISR activation, the UE 10 does not have to perform location registration again on the network unless it leaves the routing area registered through the SGSN 30, or the tracking area(s) registered through the MME 20. This feature (function) is ISR. A combined area of the routing area registered by the UE 10 through the SGSN 30, and the tracking area(s) registered by the UE 10 through the MME 20 is called as an ISR area (refer to FIG. 1). When the UE frequently moves between the E-UTRAN and the UTRAN/GERAN, waste of network resources may be reduced by omitting repetitive location registration procedures under the ISR feature.

FIG. 5 is a signal flowchart showing ISR activation in a network in accordance with the conventional art. More concretely, FIG. 5 shows that the UE 10 initially camping on the GERAN or UTRAN cell moves to the E-UTRAN cell (S5-5), and then camps on the E-UTRAN cell. A cell on which the UE 10 has initially camped in FIG. 5 is different from that in FIG. 4 (i.e., GERAN or UTRAN cell in FIG. 5 and E-UTRAN cell in FIG. 4). Accordingly, an operation and a function of each signaling in FIG. 5 correspond to those in FIG. 4. Therefore, explanations for each signaling in FIG. 4 can be applied to a corresponding signaling in FIG. 5. Signals transmitted through the eNodeB 21 in FIG. 4 are transmitted through the RNC/BSC 31 in FIG. 5, and vice versa.

Hereinafter, with reference to FIGS. 6 and 7, will be explained keeping an ISR activated state in case of intra-SGSN mobility and intra-MME mobility.

FIG. 6 is a signal flowchart showing that an ISR activated state is kept in case of intra-SGSN mobility in accordance with the conventional art.

FIG. 6 shows that an ISR activated state is kept in case of the UE's intra-SGSN mobility. As the UE moves to another GERAN or UTRAN cell from the GERAN or UTRAN cell, the UE performs location registration on the SGSN. Here, it is assumed that the previously location-registered SGSN and the newly location-registered SGSN are same (i.e., intra-SGSN mobility).

S6-1~S6-13 of FIG. 6 are equal to S4-1~S4-13 of FIG. 4, and thus detailed explanations thereof will be replaced by those of FIG. 4. Hereinafter, will be explained S6-14~S6-17 of FIG. 6, i.e., a location registration process on the SGSN 30 by the UE 10 as the UE moves to the new GERAN or UTRAN cell (i.e., intra-SGSN mobility), and a process for deciding to keep ISR activation by the SGSN 30.

The UE 10 moves to a new GERAN or UTRAN cell. Then, the UE 10 recognizes that a Routing Area (RA) to which the new GERAN or UTRAN cell belongs is different from the previously location-registered RA, and decides to perform location registration (S6-14).

For location registration on the HSS 40 through the SGSN 30, the UE 10 sends a Routing Area Update Request message to the SGSN 30 through the RNC/BSC 31 (S6-15). Here, the UE 10 includes an old RAI (Routing Area Identity) parameter in the Routing Area Update Request message.

The SGSN 30 determines whether to keep or deactivate an activated ISR for the UE (S6-16). If a Routing Area Update (RAU) procedure performed by the UE 10 based on the decision by the SGSN 30 is an intra-SGSN RAU procedure, the currently activated ISR feature is kept. After checking the old RAI parameter included in the Routing Area Update Request message received from the UE 10, the SGSN 30 recognizes that the old RA is also served by itself (i.e., intra-SGSN RAU procedure). Accordingly, the SGSN decides to continuously keep (maintain) the currently activated ISR feature.

A Routing Area Update Accept message is transmitted from the SGSN 30 to the UE 10 through the RNC/BSC 31 (S6-17). Here, the SGSN 30 includes an 'ISR Activated' parameter in the Routing Area Update Accept message, thereby informing the UE 10 about decision for ISR activation. The Routing Area Update Accept message may include a Routing Area Identity (RAI).

In summary, in FIG. 6, when the UE performs intra-SGSN mobility after an ISR feature is activated, the SGSN 30 on which the UE performs location registration determines to keep the activated ISR feature.

FIG. 7 is a signal flowchart showing that ISR activation is kept in case of the UE's intra-MME mobility.

That is, FIG. 7 shows that an ISR activated state is kept in case of the UE's intra-MME mobility. Referring to FIG. 7, as the UE moves to another E-UTRAN cell from the E-UTRAN cell, the UE 10 performs location registration on the MME 20. Here, it is assumed that the previously location-registered MME 20 and the newly location-registered MME 20 are same (i.e., intra-MME mobility). It is also assumed that a Serving GW has no changes in case of the intra-MME mobility.

FIG. 6 shows that ISR activation is kept in case of intra-SGSN mobility, whereas FIG. 7 shows that ISR activation is kept in case of intra-MME mobility. Therefore, explanations for each signaling in FIG. 6 can be applied to a corresponding signaling in FIG. 7. Hereinafter, FIG. 7 will be explained in brief.

S7-1~S7-14 of FIG. 7 are equal to S5-1~S5-14 of FIG. 5, and thus detailed explanations thereof will be replaced by those of FIG. 5. Hereinafter, will be explained S7-15~S7-19 of FIG. 7, i.e., a location registration process on the MME 20 by the UE 10 as the UE moves to the E-UTRAN cell (i.e., intra-MME mobility), and a process for deciding to keep ISR activation by the MME 20.

The UE 10 moves to a new E-UTRAN cell. Then, the UE 10 performs location registration in a Tracking Area (TA) to which the new E-UTRAN cell belongs (S7-15). The reason why the UE 10 has to perform location registration is because the TA to which the UE 10 has entered is not included in a TAI list received through a Tracking Area Update Accept message of S7-14 when the UE 10 previously performed location registration on the MME 20.

For location registration on the HSS 40 through the MME 20, the UE 10 sends a Tracking Area Update Request message to the eNodeB 21 (S7-16). Here, the UE 10 sends a Radio Resource Control (RRC) parameter including an old GUMMEI (Globally Unique MME Identifier), together.

Based on the RRC parameter received from the UE 10 together with the Tracking Area Update Request message, the eNodeB 21 determines an MME 20 to which the Tracking Area Update Request message is to be forwarded. Then, the eNodeB 21 forwards (transfers or delivers) the Tracking Area Update Request message to the determined MME 20 (S7-17). In FIG. 7, it is assumed that the MME 20 which serves the new TA to which the UE 10 has entered is the same as the MME 20 on which the UE 10 has previously performed location registration (S7-6~S7-14).

The MME 20 determines to keep or deactivate an activated ISR feature for the UE 10 (S1-18). If the Serving GW has not changed, the MME 20 decides to keep an activated ISR feature since location registration has been performed on the same MME 20 as the previous MME 20.

The MME 20 sends a Tracking Area Update Accept message to the UE 10 through the eNodeB 21 (S7-19). Here, the MME 20 includes an 'ISR Activated' parameter in the Tracking Area Update Accept message, thereby informing the UE 10 about decision for ISR activation. The Tracking Area Update Accept message includes a TAI (Tracking Area Identity) list.

In FIG. 7, when the UE 10 performs intra-MME mobility after an ISR feature is activated, the MME 20 on which the UE performs location registration decides to keep the activated ISR feature unless the Serving GW is changed.

FIG. 8 is a signal flowchart showing data transfer on a downlink when an ISR feature has been activated. In FIG. 8, it is assumed that an ISR feature has been activated through the processes of FIG. 4 or FIG. 6. FIG. 8 shows a method for delivering downlink data to the UE which is in an idle mode when an ISR feature has been activated. For convenience, it is assumed that the UE of FIG. 8 is camping on the E-UTRAN cell.

A Serving GW ('S-GW') 50 receives a downlink data packet destined to the UE 10 through a P-GW 60 (S8-1). The S-GW 50 buffers the downlink data packet, and identifies a mobility management node serving the UE 10, a receiver of the downlink data packet. Through this identification procedure by the S-GW 50, it is checked that an ISR feature for the UE 10 has been activated, and both of the MME 20 and the SGSN 30 serve the UE 10. Accordingly, the S-GW 50 has to request both of the MME 20 and the SGSN 30 to perform paging for the UE.

More concretely, the S-GW 50 sends a Downlink Data Notification message to the MME 20 and the SGSN 30, respectively (S8-2). As a response to the Downlink Data Notification message, the MME 20 and the SGSN 30 send a Downlink Data Notification Ack message to the S-GW 50, respectively (S8-3).

The MME 20 and the SGSN 30 send a paging message to the UE 10 through each serving access network (S8-4a~S8-5a and S8-4b~S8-5b). This will be explained in more detail as follows.

The MME 20 sends a paging message to each eNodeB 21 included in the tracking area(s) on which the UE 10 has registered (S8-4a). The SGSN 30 sends a paging message to the RNC/BSC 31 (S8-4b).

Each eNodeB 21 having received the paging message from the MME 20 performs paging for the UE 10 (S8-5a). And, the RNC/BSC 31 having received the paging message from the SGSN 30 performs paging for the UE 10 (S8-5b).

In an assumption that UE 10 currently camps on the E-UTRAN cell, the UE 10 responds to the paging via the E-UTRAN (i.e., S8-4a~S8-5a). The UE 10 performs a Service Request Procedure, thereby setting up a user plane as a path via the E-UTRAN (S8-6). The Service Request Procedure has been defined in clause 5.3.4.1 (UE triggered Service Request) of 3GPP TS 23.401 v9.3.0, and thus detailed explanations thereof will be omitted.

The S-GW 50 sends downlink data to the UE 10 through the E-UTRAN (via the eNodeB 21) (S8-7).

In FIG. 8, it is assumed that the UE 10 camps on the E-UTRAN cell. If the UE 10 of FIG. 8 camps on the UTRAN/GERAN cell rather than the E-UTRAN cell, the UE 10 will respond to a paging which has passes through the UTRAN/GERAN (i.e., S8-4b S8-5b). And, if a user plane is set in S8-6, downlink data will be delivered to the UE 10 from the S-GW 50, via the UTRAN/GERAN (i.e., via the RNC/BSC 31 and the NodeB 32).

As aforementioned, since the network manages the UE's location as a unit of an ISR area, paging is performed as a unit of ISR area in order to transfer downlink data to the UE which is in an idle mode.

In an IMS network, an IMS voice service is provided to the UE over a Packet Switched (PS) domain or a Circuit Switched (CS) domain. Accordingly, the IMS network has to determine whether the UE can receive the IMS voice service over PS domain or CS domain.

In order for the SCC AS (Service Centralization and Continuity Application Server) in the IMS network to deliver a Mobile Terminating (MT) voice call to the UE, the SCC AS has to select an access domain (PS or CS domain) by executing Terminating Access Domain Selection (T-ADS) functionality. Here, the SCC AS has to select an access domain with consideration of the UE's current location, an access network's capability with respect to voice, etc.

When an ISR feature has been activated, the network will identify the UE's location at the ISR area. Therefore, the network can not check the UE's precise location due to the activated ISR (whether the UE is in the E-UTRAN or UTRAN/GERAN). In this case, if support of IMS voice over PS session is not consistent between the E-UTRAN and the UTRAN/GERAN that belong to the ISR area, this inconsistency may cause sequential paging from the CS domain to the PS domain, or from the PS domain to the CS domain for successful delivery of an MT voice call to the UE by the IMS network. For instance, in a state that the UE is camping on a cell where IMS voice over PS session is not supported, the IMS network may firstly select the PS domain for delivery of an MT voice call. In this case, call setup delay, a critical factor of a voice call service may increase, and a caller may terminate his or her call while waiting for call connection. This may cause call loss.

The above problems occur even in the case of the UE's intra-SGSN mobility shown in FIG. 2 and in the case of the UE's intra-MME mobility shown in FIG. 3. For instance, the UE moves from a first cell (e.g., RA1) served by the SGSN (network entity which provides a service to the UE with respect to the UTRAN/GERAN), and camps on a second cell (e.g., RA2) served by the same SGSN. In this case, since an activated ISR feature is kept, the UE does not have to perform location registration again on the network unless it leaves the routing area (RA2) registered through the SGSN, or the tracking area(s) registered through the MME. Here, the tracking area(s) registered through the MME support IMS voice over PS session. However, in an assumption that the second cell of the SGSN does not support IMS voice over PS session, if the IMS network delivers MT voice call to the UE over PS domain, the UE cannot receive the voice call. This may cause the aforementioned call termination and call loss.

In case of the intra-MME mobility shown in FIG. 3, the UE moves from a first cell of the E-UTRAN (e.g., TA1 of TAI list 1) served by the MME, and camps on a second cell served by the same MME (e.g., TA4 of TAI list 2). In this case, since an activated ISR feature is kept, the UE does not have to perform location registration again on the network unless it leaves the routing area registered through the SGSN, or the tracking area(s) (TAI list 2) registered through the MME. In the case of intra-MME mobility, call termination and call loss occurred in the case of intra-SGSN mobility may also occur.

DISCLOSURE OF INVENTION

Solution To Problem

Therefore, it is an object of the present invention to provide a method for determining Idle mode Signaling Reduction (ISR) deactivation in a mobile communications system capable of allowing a Service Centralization and Continuity Application Server (SCC AS) to successfully send an MT voice call at a time by improving ISR activation. That is, an access domain for delivering a voice call can be precisely selected at a time by allowing the SCC AS to be aware of a precise current location of a User Equipment (UE). For this, when deciding to activate or deactivate an ISR feature by a mobility management node (i.e., MME or SGSN), a condition (information) on whether each mobility management node can support IMS voice over PS session, etc. may be further considered.

To achieve these and other advantages and in accordance with the purpose of the present invention, as embodied and broadly described herein, there is provided a method for determining Idle mode Signaling Reduction (ISR) deactivation in a mobile communications system where a first network entity and a second network entity are included and an ISR feature for a user equipment (UE) has been activated, the method comprising: (A) receiving, by the first network entity, from the UE, a location registration request message as the UE moves to a second cell from a first cell and reselects the second cell, the first and second cells served by the first network entity; (B) deciding, by the first network entity, to keep or deactivate an activated idle mode signaling reduction (ISR) feature based on information on whether IMS (IP Multimedia Subsystem) voice over PS (Packet Switched) session can be supported; and (C) sending, by the first network entity, to the UE, a location registration accept message including information on the decision to keep or deactivate an activated ISR feature.

Preferably, the method may further comprise: sending, by the first network entity, to the second network entity, a context request message for acquiring information on previous location-registration performed by the UE; and receiving, by the first network entity, from the second network entity, a context response message including information on whether IMS voice over PS session can be supported.

Preferably, the method may further comprise determining, by the first network entity, whether to activate an ISR feature based on the information on whether an ISR feature can be supported.

Preferably, the context response message may include an 'ISR Supported' parameter indicating information on whether the second network can support an ISR feature.

Preferably, the context response message may include a parameter indicating information on whether the second network can support an IMS voice over PS domain (PS session).

Preferably, the (B) may include determining whether the first and second network entities support an ISR feature; determining whether the UE is a UE using IMS voice (voice over IMS); and deciding to activate or deactivate the ISR feature according to whether the first network entity supports IMS voice over PS session for the second cell and whether the second network entity supports IMS voice over PS session.

In a case that the first and second network entities can support an ISR feature and the UE uses IMS voice, the first network entity may preferably decide to keep an activated ISR feature when the first network entity can support IMS voice over PS session for the second cell and the second network entity can support IMS voice over PS session, or when the first network entity does not support IMS voice over PS session for the second cell and the second network entity does not support IMS voice over PS session.

In a case that the first and second network entities can support an ISR feature and the UE uses IMS voice, the first network entity may preferably decide for ISR deactivation when only one of the first and second network entities can support IMS voice over PS session.

Preferably, the first network entity serving as a mobility management node may be a Serving GPRS Support Node (SGSN) of Universal Mobile Telecommunication System (UMTS), which takes charge of Universal Terrestrial Radio Access Network (UTRAN) or GSM/EDGE Radio Access Network (GERAN). And, the second network entity serving as a mobility management node may be a mobility management entity (MME) of Evolved Packet System (EPS), which takes charge of E-UTRAN.

Preferably, the first network entity serving as a mobility management node may be an MME of EPS, which takes charge of E-UTRAN, and the second network entity serving as a mobility management node may be an SGSN of UMTS, which takes charge of UTRAN or GERAN.

Preferably, the information on the decision to keep or deactivate an activated ISR feature in step (C) may be indicated as an 'ISR Deactivated parameter' or an 'ISR Activated parameter'.

The present invention may have the following advantages.

Firstly, in case of intra-SGSN mobility or intra-MME mobility, whether each mobility management node can support IMS voice over PS session can be determined, and the mobility management node can decide for ISR activation for the UE based on the determination.

Secondly, the UE can register a current location on a network according to keeping or deactivation of the activated ISR feature. This may allow an IMS network to precisely select a corresponding domain for delivery of an MT voice call, thereby enabling successful transfer of an MT voice call to the UE at a time.

Thirdly, in case of intra-SGSN mobility or intra-MME mobility, the method of the present invention may reduce signaling caused by unsuccessfully sending a voice call over PS domain by the IMS network and then by re-sending the voice call over CS domain by the IMS network, the signaling resulting from ISR activation without considering whether the mobility management node can support IMS voice over PS session. This may enhance efficiency of network resources. As unnecessary signaling is reduced, call delay due to voice call setup may be prevented.

MODE FOR THE INVENTION

Figure 1:
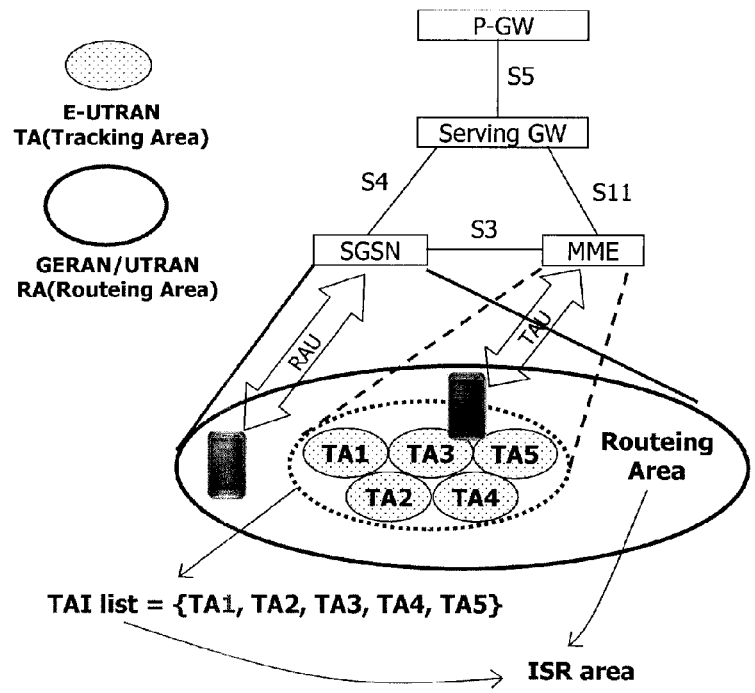
FIG. 1 is a configuration view of an Idle mode Signaling Reduction (ISR) service in accordance with the conventional art.
Figure 2:
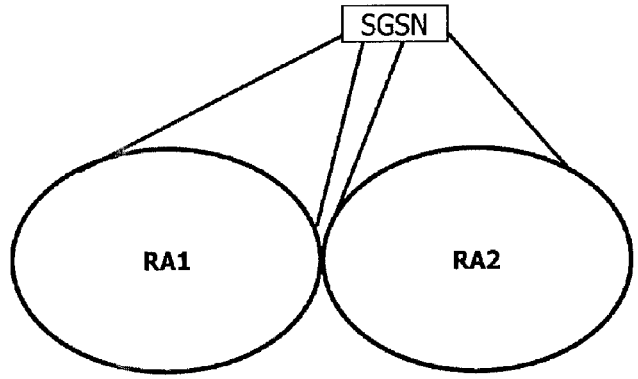
FIG. 2 shows an example of intra-SGSN mobility that a UE having performed location registration in RA1 moves to RA2.
Figure 3:
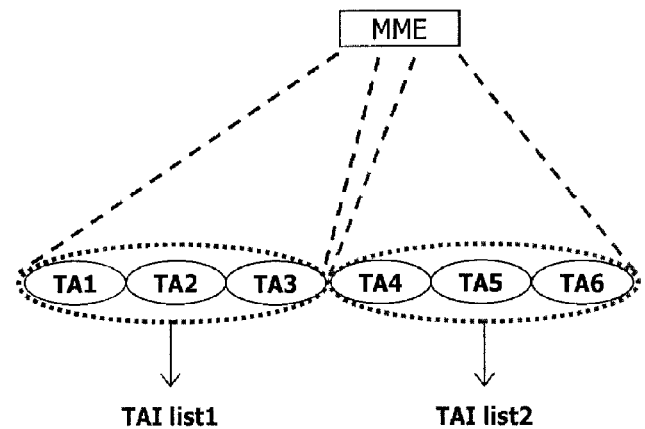
FIG. 3 shows an example of intra-MME mobility that a UE having performed location registration in TA3 moves to TA4.
Figure 4:
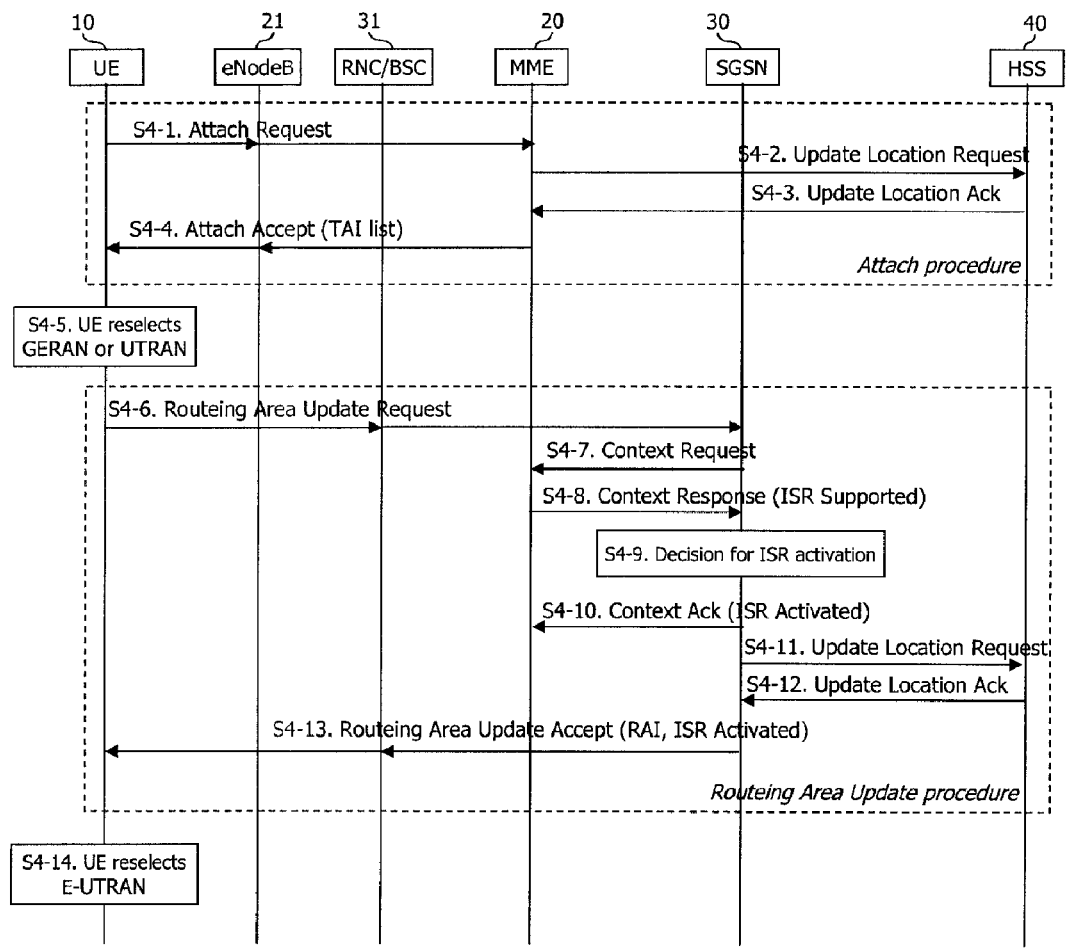
FIG. 4 is a signal flowchart showing ISR activation in a network in accordance with the conventional art.
Figure 5:
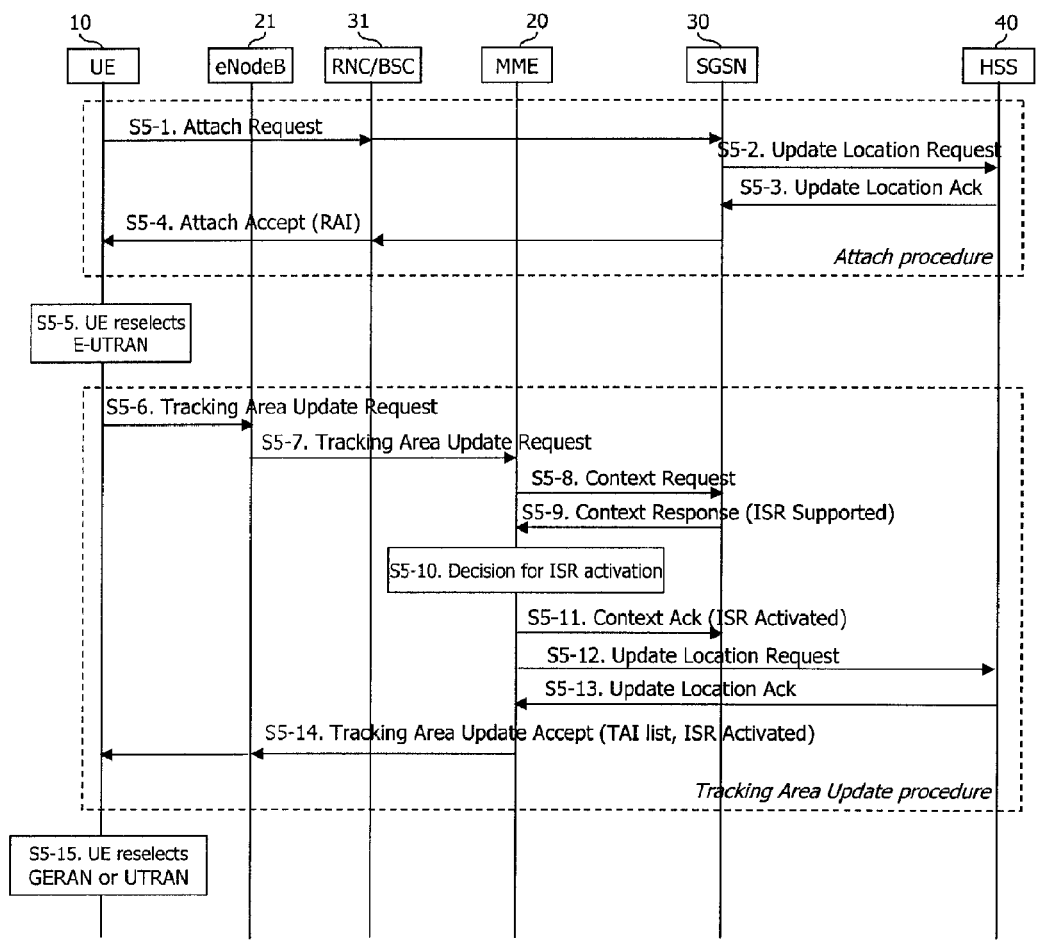
FIG. 5 is a signal flowchart showing ISR activation in a network in accordance with the conventional art.

Reference will now be made in detail to the preferred embodiments of the present invention, examples of which are illustrated in the accompanying drawings.

The present invention is applied to a mobile communications system to which an Idle mode Signaling Reduction (ISR) is applied. However, the present invention is not limited to the system, but may also be applied to other next-generation communications systems and wired/wireless communications to which the technical scope of the present invention may be applied.

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In a case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

The terms used in the present invention will be explained as follows.

A terminal indicates all devices which can perform the technical features of the present invention. The terminal includes not only a mobile communication terminal (e.g., a user equipment (UE), a mobile phone, a portable phone, a DMB phone, a game phone, a camera phone, a smart phone, etc.) for setting up an IP tunnel with a network and transmitting and receiving data to/from a network node through the setup IP tunnel, but also a notebook, a desktop computer, a laptop computer, a palmtop computer, a personal digital assistant (PDA), white goods, etc.

An access system indicates a network via which a terminal accesses a core network for the purpose of communications (e.g., voice communications, data communications, video communications). For instance, referring to FIG. 1, a 3GPP access system includes UTRAN/GERAN or E-UTRAN, and a non-3GPP access network includes I-WLAN or CDMA/WiMax. This access system may not be limited to a wireless access system, but may be applied to a wired access system, e.g., a broadband access network or a digital subscriber line (DSL).

An Internet Protocol (IP) tunnel indicates a data path for communications between entities (e.g., a terminal and a network node).

A mobility protocol indicates a protocol used by a UE for mobility management and data transfer by accessing a core network. The mobility protocol used between the terminal and the network may include a plurality of types according to a type and a characteristic of an access system.

An attach indicates a state that a terminal accesses a network node, which includes an attach occurring in the event of handover.

Hereinafter, the present invention will be explained in more detail based on the above technical terms.

A concept of the present invention is that activation or deactivation of an ISR feature is decided based on a UE's capability (e.g., in a case that an incoming voice call can not be received over PS domain), or a capability of a UE or a network in a case that the network supports an ISR feature. That is, in the present invention, when deciding in case of the UE's intra-SGSN mobility or in case of the UE's intra-MME mobility, by a mobility management node, ISR activation for a UE in an IMS network environment where heterogeneous mobile communications networks (e.g., E-UTRAN and UTRAN/GERAN) interwork with each other, considered are not only whether the mobility management node can support an ISR feature, and whether the UE can use IMS voice, but also conditions (information) on whether each mobility management node can support IMS voice over PS session.

Reference will now be given in detail to the preferred embodiments of the present invention, examples of which are illustrated in the accompanying drawings. Wherever possible, the same reference numerals will be used through the drawings to refer to the same or similar parts, and the same descriptions thereof are omitted.

The present invention may have two preferred embodiments. The first embodiment is a case of intra-SGSN mobility shown in FIGS. 9, 11 and 13, whereas the second embodiment is a case of intra-MME mobility shown in FIGS. 10, 12 and 14. For convenience, the case of "intra-SGSN mobility" and the case of "intra-MME mobility" will be integrally explained.

(1) Firstly, the present invention will be explained through the case of "intra-SGSN mobility" of FIG. 9, and the case of "intra-MME mobility" of FIG. 10.

(2) Secondly, with reference to the case of "intra-SGSN mobility" of FIG. 9, the present invention will be explained through a signal flowchart of FIG. 11 which shows that an IMS network delivers voice over IMS to a UE. With reference to the case of "intra-MME mobility" of FIG. 10, the present invention will be explained through a signal flowchart of FIG. 12 which shows that an IMS network delivers voice over IMS to a UE.

(3) Thirdly, will be explained a method for determining whether to keep or deactivate an ISR feature in the case of "intra-SGSN mobility" of FIG. 13 as a first embodiment of the present invention. And, will be explained a method for determining whether to keep or deactivate an ISR feature in the case of "intra-MME mobility" of FIG. 14 as a second embodiment of the present invention.

Hereinafter, the case of "intra-SGSN mobility" of FIG. 9 and the case of "intra-MME mobility" of FIG. 10 will be explained. Firstly, a homogeneous ISR area and a non-homogeneous ISR area will be defined. Here, the present invention is not limited to the terms.

Figure 9:
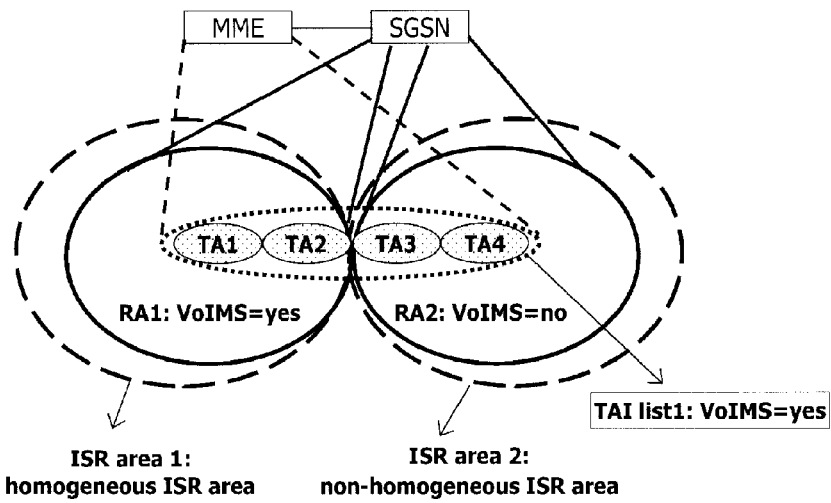
FIG. 9 shows a UE's intra-SGSN mobility.

FIG. 9 shows that a UE moves from an ISR area (i.e., ISR area 1) where IMS voice over PS session can be entirely supported, to an ISR area (i.e., ISR area 2) where IMS voice over PS session can be partially supported, in case of intra-SGSN mobility.

Referring to FIG. 9, the RA1 and the RA2 correspond to UTRAN or GERAN cells managed or served by the same SGSN, and the TAI list 1 (including TA1, TA2, TA3 and TA4) corresponds to E-UTRAN cells managed or served by the MME. In FIG. 9, the ISR area 1 indicates a homogeneous ISR area, whereas the ISR area 2 indicates a non-homogeneous ISR area.

The homogeneous ISR area indicates that support of IMS voice over PS session is consistent between the UTRAN (or GERAN) cell (i.e., RA1) belonging to the ISR area and the E-UTRAN cell (i.e., TA1 and TA2) belonging to the ISR area, which is implemented in the ISR area 1. On the other hand, the non-homogeneous ISR area indicates that support of IMS voice over PS session is not consistent between the UTRAN (or GERAN) cell (i.e., RA2) belonging to the ISR area and the E-UTRAN cell (i.e., TA3 and TA4) belonging to the ISR area, which is implemented in the ISR area 2. Referring to FIG. 9, in the ISR area 2, RA2 does not support IMS voice over PS session, which is indicated as "RA2: VoIMS=no". On the other hand, the E-UTRAN cell, TA3 and TA4 in the ISR area 2 support IMS voice over PS session, which is indicates as "TAI list 1: VoIMS=yes".

Cases of the homogeneous ISR area and the non-homogeneous ISR area will be explained as follows:

—Homogeneous ISR Area:

1) A case in which RA (routing area) supports IMS voice over PS session (RA: IMS voice over PS session=yes), and TAI list supports IMS voice over PS session (TAI list: IMS voice over PS session=yes);

2) A case in which RA (routing area) does not support IMS voice over PS domain (RA: IMS voice over PS session=no), and TAI list does not support IMS voice over PS session (TAI list: IMS voice over PS session=no).

—Non-Homogeneous ISR Area:

1) A case in which RA (routing area) supports IMS voice over PS session (RA: IMS voice over PS session=yes), but TAI list does not support IMS voice over PS session (TAI list: IMS voice over PS session=no);

2) A case in which RA (routing area) does not support IMS voice over PS session (RA: IMS voice over PS session=no), but TAI list supports IMS voice over PS session (TAI list: IMS voice over PS session=yes).

More concretely, when a routing area has the same attribute to the tracking areas included in a TAI list in the aspect of IMS voice over PS session, an ISR area that consists of these routing and tracking areas is called as a homogeneous ISR area. On the other hand, when a routing area has a different attribute to the tracking area included in a TAI list in the aspect of IMS voice over PS session, an ISR area that consists of these routing and tracking areas is called as a non-homogeneous ISR area.

Figure 6:
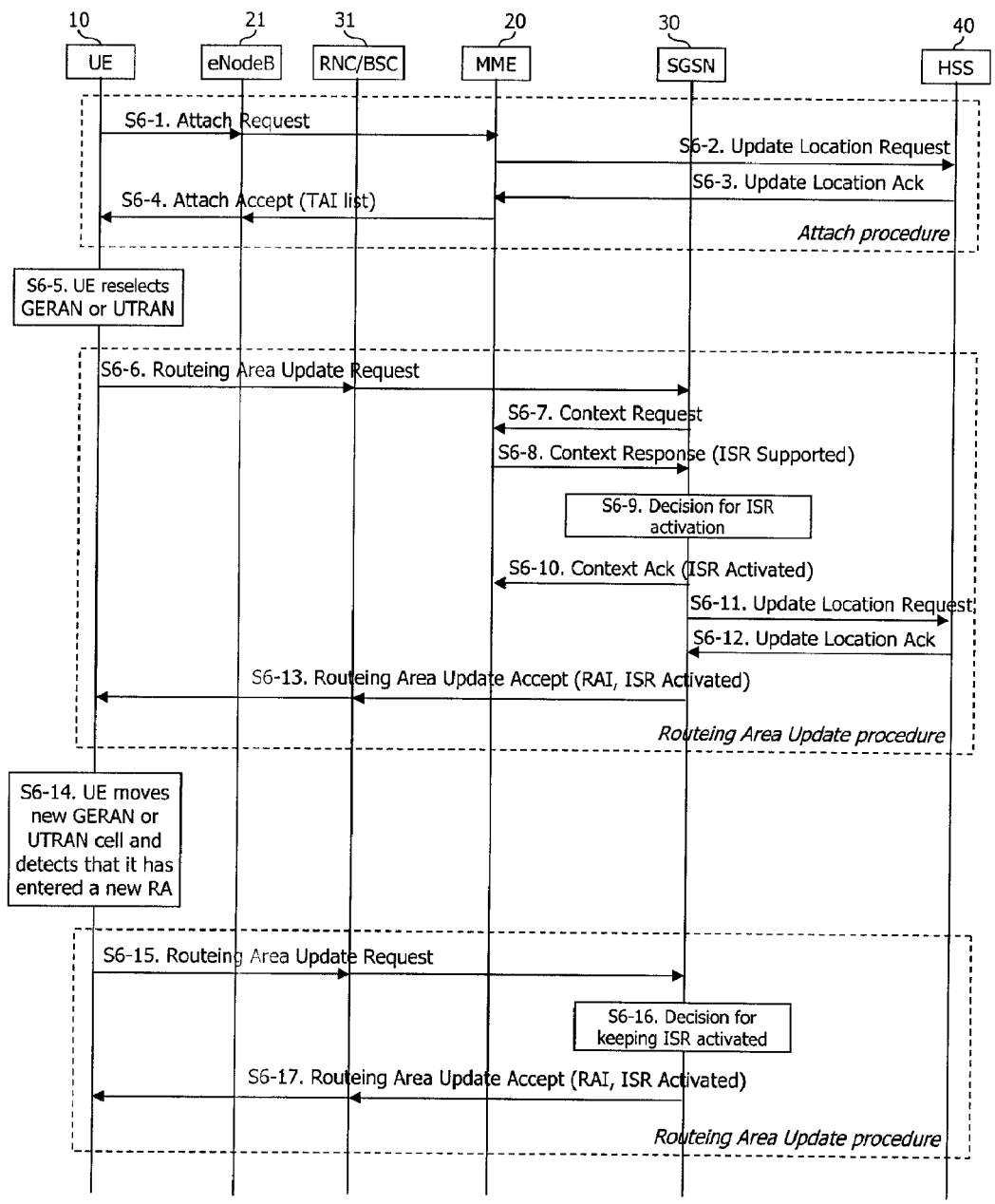
FIG. 6 is a signal flowchart showing that ISR activation in case of a UE's intra-SGSN mobility is kept in accordance with the conventional art.

Hereinafter, FIG. 9 will be explained in more detail with reference to a signal flowchart of FIG. 6.

In an assumption that the UE currently camps on the E-UTRAN cell of TA1 in FIG. 9, the UE performs an attach procedure to the MME in the TA1. Here, the TA1 is a tracking area where IMS voice over PS session can be supported, which is indicated as "VoIMS" in FIG. 9. The TAI list 1 consisting of TA1, TA2, TA3 and TA4 contains a set of TAs where IMS voice over PS session. As the UE 10 moves away from the E-UTRAN to reselect the UTRAN, the UE performs a Routing Area Update procedure to the SGSN 30 in the RA1. ISR activation is informed through a Routing Area Update Accept message transmitted to the UE 10 from the SGSN 30. Here, the RA1 supports IMS voice over PS session. As defined above, the RA1 which belongs to the ISR area 1, and the TAI list 1 support IMS voice over PS session. Accordingly, the ISR area 1 corresponds to a homogeneous ISR area.

As the UE 10 moves to the UTRAN cell which belongs to the RA2, the UE 10 performs a Routing Area Update procedure to the SGSN 30. As the UE 10 performs location registration to the same SGSN 30 as the previously location-registered SGSN 30, the SGSN 30 keeps a currently activated ISR feature. Keeping ISR activation is informed through a Routing Area Update Accept message transmitted to the UE 10 from the SGSN 30. As defined above, the RA2 does not support IMS voice over PS session.

The RA2 which belongs to the ISR area 2 does not support IMS voice over PS session. On the other hand, the TAI list 1 supports IMS voice over PS session. Accordingly, the ISR area 2 corresponds to a non-homogeneous ISR area. FIG. 9 shows an example that intra-SGSN mobility of the UE 10 results in the UE's movement from a homogeneous ISR area to a non-homogeneous ISR area. In FIG. 9, the UE 10 does not have to perform location registration on the network again since an ISR feature is activated unless the UE 10 leaves the RA2 and the TAs which belong to the TAI list 1.

Figure 10:
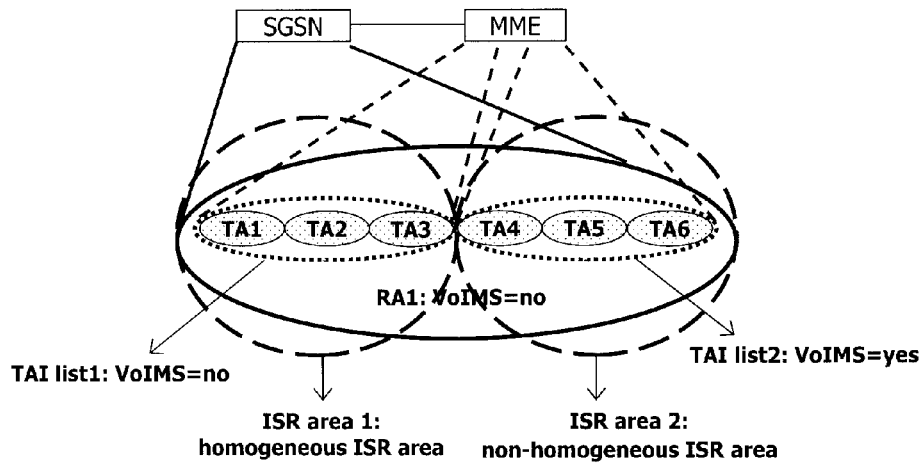
FIG. 10 shows a UE's intra-MME mobility.

Contrary to the intra-SGSN mobility of FIG. 9, FIG. 10 shows intra-MME mobility.

Referring to FIG. 10, the RA1 corresponds to the UTRAN or GERAN cells managed or served by the SGSN, whereas TAI list 1 (including TA1, TA2 and TA3) and TAI list 2 (including TA4, TA5 and TA6) correspond to the E-UTRAN cells managed or served by the same MME. In FIG. 10, the ISR area 1 is a homogeneous ISR area, and the ISR area 2 is a non-homogeneous ISR area. The homogeneous ISR area and the non-homogeneous ISR area have been already defined in FIG. 9.

FIG. 10 shows that the UE moves from the ISR area (i.e., ISR area 1) where IMS voice over PS session is not supported over PS session, to the ISR area (i.e., ISR area 2) where IMS voice over PS session can be partially supported, in case of intra-MME mobility.

Figure 7:
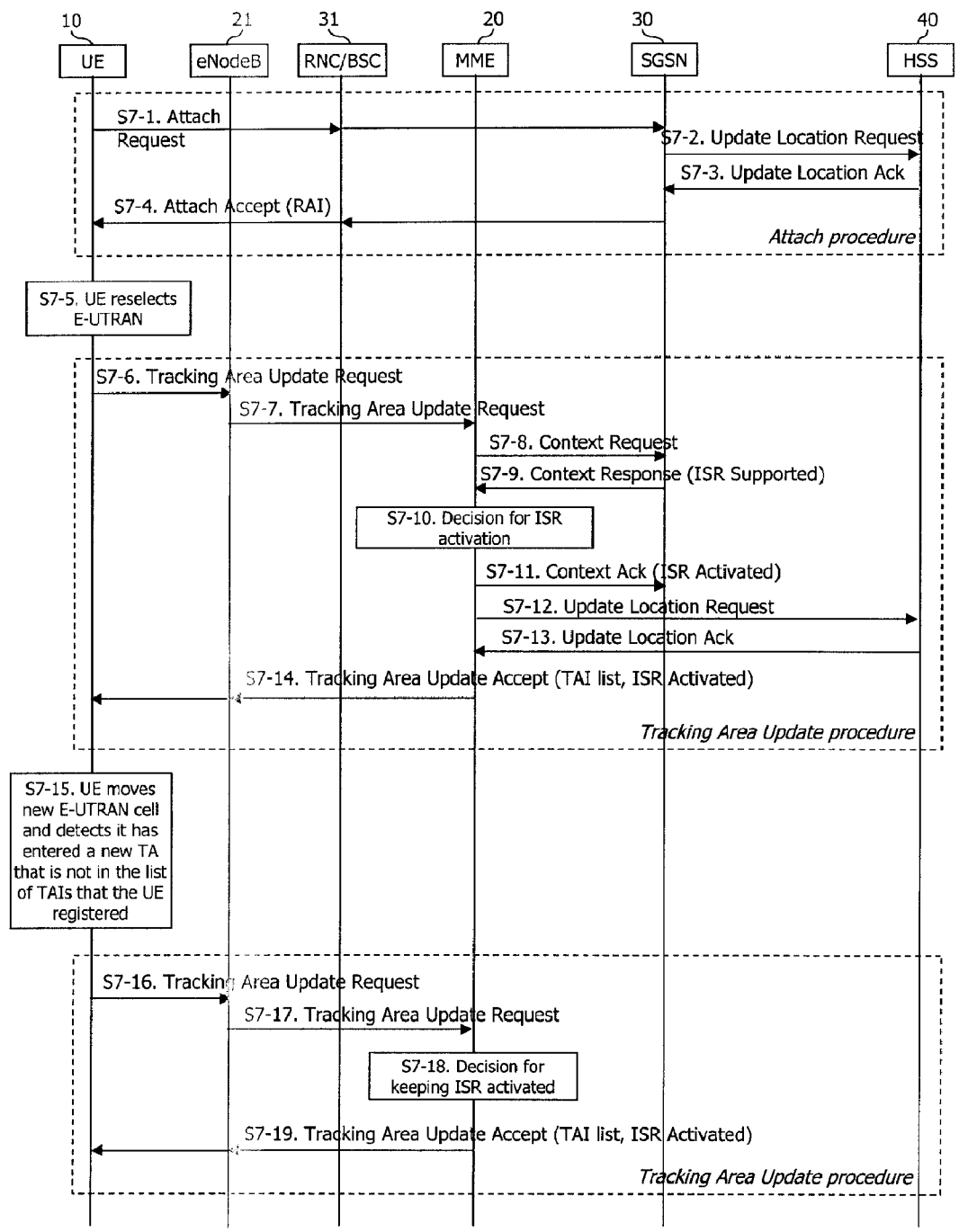
FIG. 7 is a signal flowchart showing that ISR activation in case of a UE's intra-MME mobility is kept in accordance with the conventional art.
Figure 8:
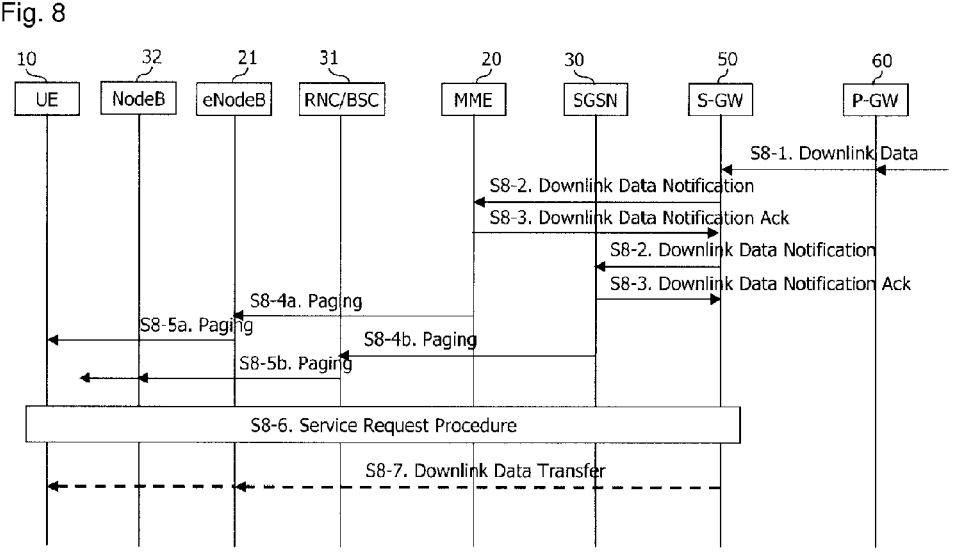
FIG. 8 is a signal flowchart showing data transfer on a downlink when an ISR feature has been activated.

Hereinafter, FIG. 10 will be explained in more detail with reference to a signal flowchart of FIG. 7.

In an assumption that the UE currently camps on the RA1 of the UTRAN in FIG. 10, the UE 10 performs an attach procedure to the SGSN 30 in the RA1. Here, the RA1 is a routing area where IMS voice over PS session is not supported, which is indicated as "VoIMS" in FIG. 10. As the UE 10 reselects the E-UTRAN, the UE 10 performs a Tracking Area Update procedure to the MME 20 in the TA3. Then, the MME 20 activates an ISR feature, and sends, to the UE 10, the TAI list 1 including the TA1, TA2 and TA3 by including in a Tracking Area Update Accept message. The TAs (TA1, TA2 and TA3) which belong to the TAI list 1 do not support IMS voice over PS session. As the E-UTRAN does not support IMS voice over PS session, the UE 10 is provided with a voice service through CSFB when camping on the E-UTRAN.

In FIG. 10, the RA1 and the TAI list 1 which belong to the ISR area 1 do not support IMS voice over PS session. Accordingly, as defined in FIG. 9, the ISR area 1 of FIG. 10 is a homogeneous ISR area. As the UE 10 moves to the E-UTRAN cell which belongs to the TA4, the UE 10 performs a Tracking Area Update procedure to the MME 20. As the UE 10 performs location registration on the same MME 20 as the previous location-registered MME 20, the MME 20 keeps a currently activated ISR feature. Then, the MME 20 sends, to the UE 10, a TAI list 2 (including TA4, TA5 and TA6) by including in a Tracking Area Update Accept message. As shown in FIG. 10, the TAs which belong to the TAI list 2 support IMS voice over PS session, which is indicated as 'TAT list 2: VoIMS=yes'. On the other hand, the RA1 which belongs to the ISR area 2 does not support IMS voice over PS session. As a result, the ISR area 2 of FIG. 10 is a non-homogeneous ISR area. FIG. 10 shows an example that intra-MME mobility of the UE 10 results in the UE's movement from a homogeneous ISR area to a non-homogeneous ISR area. The UE 10 does not have to perform location registration on the network again since an ISR feature is activated unless the UE leaves the RA1 and the TAs which belong to the TAI list 2.

Figure 11:
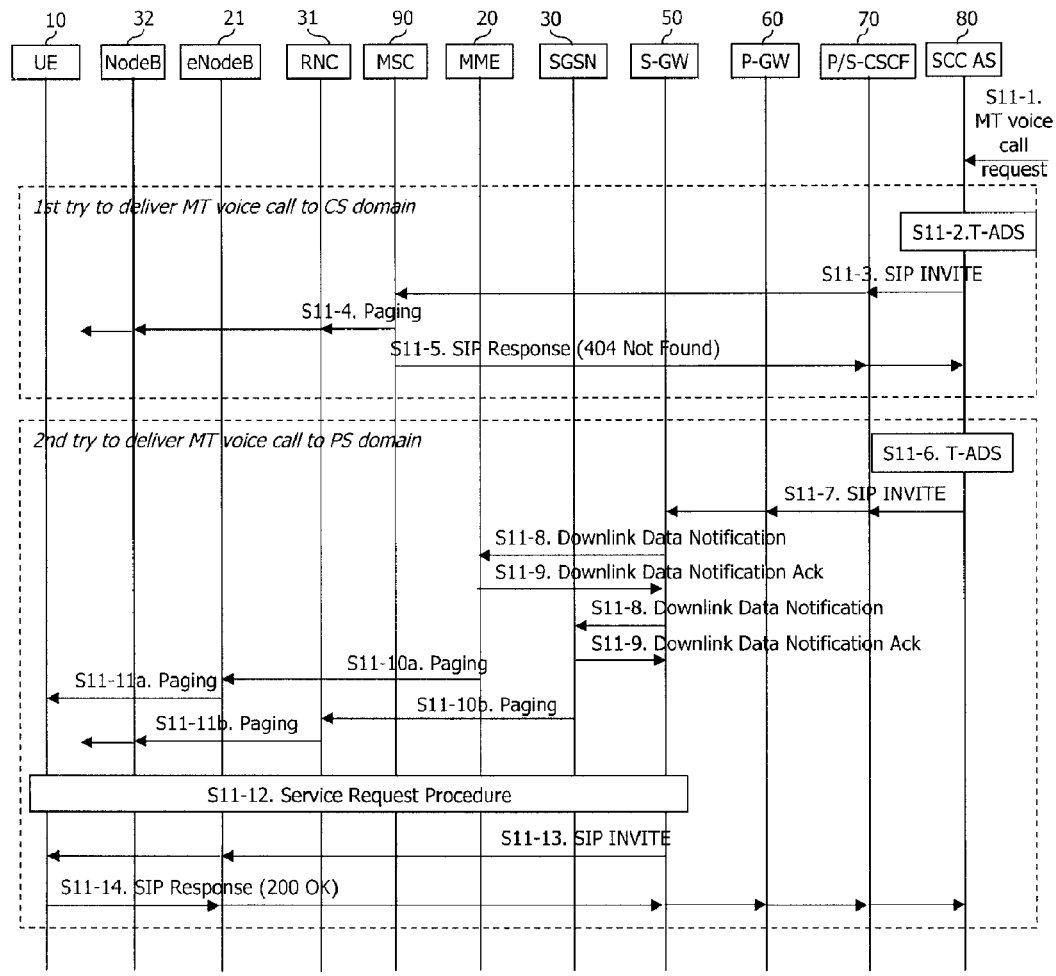
FIG. 11 shows that an IMS network has initially delivered a voice call to a UE over CS domain, and then delivers the voice call over PS domain after failure of the delivery of the voice call over CS domain.
Figure 12:
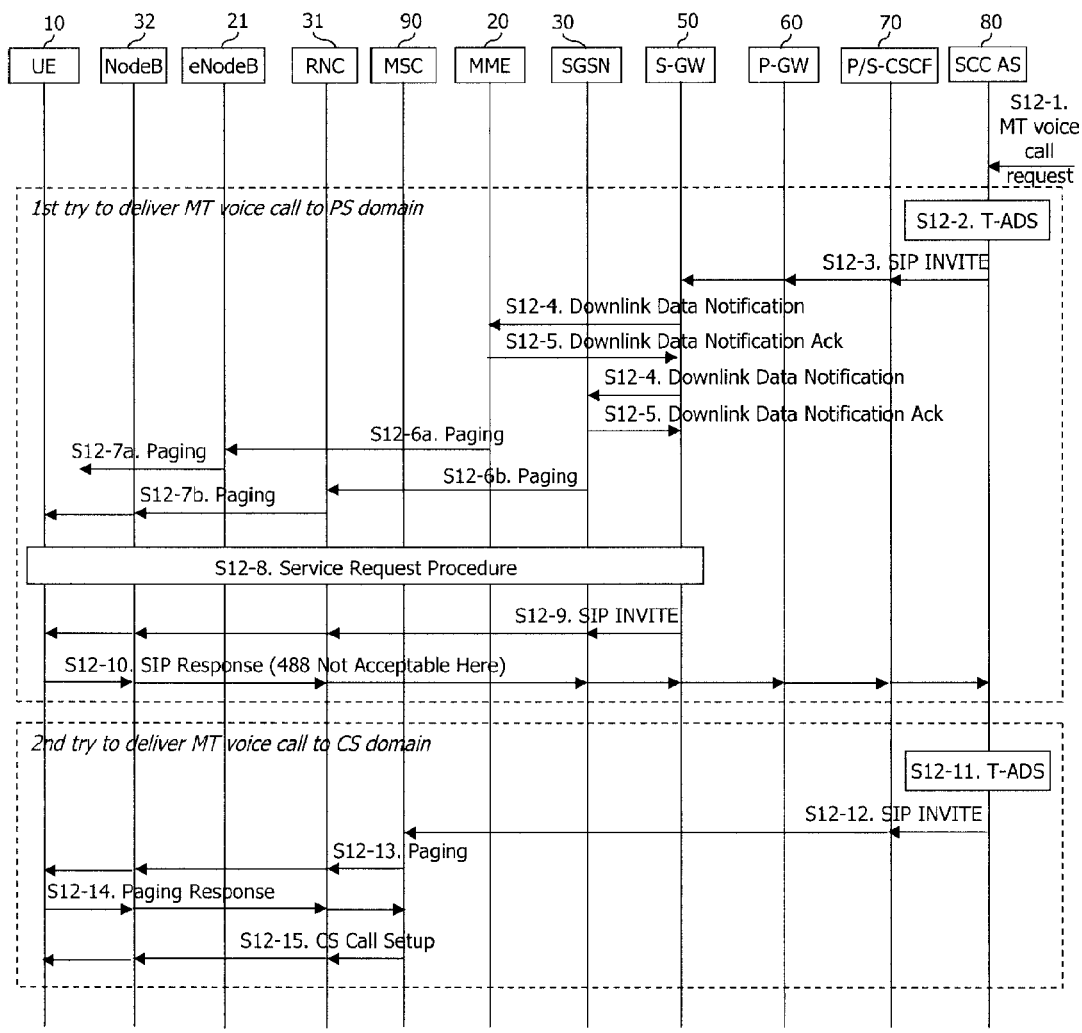
FIG. 12 shows an opposite case to FIG. 11, which illustrates that an IMS network has initially delivered a voice call to a UE over PS domain, and then delivers the voice call over CS domain after failure of the delivery of the voice call over PS domain.

FIGS. 11 and 12 show processes for delivering an MT voice call to the UE by the IMS network. More concretely, FIG. 11 shows that the IMS network has initially delivered a voice call to the UE over CS domain, and then delivers the voice call over PS domain after failure of the delivery of the voice call over CS domain. On the other hand, FIG. 12 shows that the IMS network has initially delivered a voice call to the UE over PS domain, and then delivers the voice call over CS domain after failure of the delivery of the voice call over PS domain.

Hereinafter, a process for delivering an MT voice call to the UE by the IMS network will be explained with reference to FIG. 11. In FIG. 11, it is assumed that the UE 10 having performed the scenario of FIG. 9 moves to the E-UTRAN cell which belongs to the TA4, and camps on the E-UTRAN. Then, a request message for an incoming voice call to the UE is transmitted to an SCC AS 80.

The SCC AS 80 receives the request message for an incoming voice call destined to an ICS subscriber served by itself, i.e., an SIP INVITE message (indicated as "MT voice call request" in FIG. 11) (S11-1).

The IMS network firstly delivers an incoming voice call to the UE over CS domain (S11-2~S11-5). More concretely, the SCC AS 80 decides a type of a domain (i.e., PS domain or CS domain) to which a voice call is to be delivered by using a T-ADS function (S11-2). Here, the T-ADS can perform domain selection for voice call delivery with consideration of capabilities of the access network (e.g., whether IMS voice over PS session can be supported), capabilities of the UE, an IMS registration state, a CS domain registration state, user preferences, operator policies, etc. Whether an access network on which the ICS subscriber's UE performed location registration recently can support IMS voice over PS session can be determined by the SCC AS 80 through an HSS 40 (not shown in FIG. 11). The SCC AS 80 having performed the T-ADS function determines to deliver a voice call over CS domain with considering that the UE 10 camps on the UTRAN cell which does not support IMS voice over PS session.

An SIP INVITE message for creating a session for a voice call transmitted to the UE 10 by the SCC AS 80 is delivered to an MSC server 90 via an S-CSCF and a P-CSCF 70 (S11-3). Here, The MSC server 90 can perform interworking between SIP messages and CS messages as an enhanced MSC server for providing ICS functions.

The MSC server 90 pages the UE 10 over CS domain so as to deliver the incoming voice call (S11-4).

Since the UE has sequentially moved to the RA2 and the TA4 of the ISR area 2 from the ISR area 1, the UE currently camps on the area (ISR area 2) where an IMS voice service can not be supported over CS domain.

Accordingly, the UE 10 which currently camps on the TA4 does not receive the paging. More concretely, the MSC server 90 not having received a response to the paging from the UE 10 sends, to the SCC AS 80, an SIP Response message ('404 Not Found') indicating rejection with respect to SIP session creation request for a voice call (S11-5).

Since the IMS network's first trial to deliver an MT voice call to the UE 10 over CS domain has failed, the IMS network tries to deliver the MT voice call over PS domain (S11-6~S11-14).

The SCC AS 80 having received the rejection message against request for SIP session creation from the MSC server 90 performs the T-ADS function again for voice call delivery. As a result, the SCC AS 80 having performed the T-ADS function decides to deliver a voice call over PS domain (S11-6).

The SIP INVITE message for creating a session for a voice call transmitted to the UE 10 from the SCC AS 80 is delivered to a Serving GW 50 (S-GW) via an S-CSCF, a P-CSCF and a P-GW 60 (S11-7). The S-GW 50 identifies a mobility management node (e.g., MME or SGSN) which is serving the UE 10, a receiver of an incoming voice call. Since an ISR feature for the UE 10 is in an activated state, both of the MME 20 and the SGSN 30 are in a service state for the UE 10. Accordingly, the S-GW 50 has to request for paging to both of the MME 20 and the SGSN 30 which are in a service state for the UE 10. That is, the S-GW 50 sends a Downlink Data Notification message to the MME 20 and the SGSN 30 (S11-8).

As a response to the Downlink Data Notification message, the MME 20 and the SGSN 30 respectively send a Downlink Data Notification Ack message to the S-GW 50 (S11-9).

The MME 20 sends a paging message to each eNodeB 21 which belongs to a tracking area (s) registered by the UE 10 (S11-10a). And, the SGSN 30 sends a paging message to an RNC 31 (S11-10b).

Each eNodeB 21 having received the paging message from the MME 20 performs paging for the UE 10 (S11-11a). And, the RNC 31 having received the paging message from the SGSN 30 performs paging for the UE 10 (S11-11b).

Since the UE 10 currently camps on the E-UTRAN cell, the UE 10 responses to the paging via the E-UTRAN. That is, the UE 10 sets-up a user plane as a path via the E-UTRAN, by performing a service request procedure (S11-12). Details about the service request procedure have been defined in clause 5.3.4.1 (UE triggered Service Request) of 3GPP TS 23.401 v9.3.0.

The S-GW 50 sends an SIP INVITE message to the UE 10 through the E-UTRAN so as to invite a session for a voice call (MT voice call in S11-1) over PS domain (S11-13). As a response to the SIP INVITE message, the UE 10 sends an SIP Response message (200 OK) indicating acceptance of the SIP INVITE message requesting for SIP session creation for a voice call (S11-14). Through the series of processes of FIG. 11, an incoming voice call to the UE 10 is successfully delivered to the UE 10.

FIG. 12 shows that the IMS network delivers a voice call (MT voice call) to the UE in an ISR activated state in case of the intra-MME mobility of FIG. 10.

FIG. 12 is implemented with the following assumptions.
1) An ISR features for the UE 10 is in an activated state;
2) The UE 10 has performed location registration on the E-UTRAN and the UTRAN (or GERAN);
3) As shown in FIG. 10, the cells included in the TAI list 2 of the E-UTRAN on which the UE 10 has performed location registration support IMS voice over PS session, whereas the cells of the UTRAN belonging to the RA1 and the cells included in the TAI list 1 of the E-UTRAN on which the UE 10 has performed location registration do not support IMS voice over PS session;
4) After the UE 10 has performed location registration through the E-UTRAN, an ISR feature is in an activated state. Then, as shown in FIG. 10, the UE 10 moved from the TA4 included in the TAI list 2 of the E-UTRAN and currently camps on the UTRAN cell (RA1).

Hereinafter, the present invention will be explained with reference to FIG. 12 in the above assumptions.

An SCC AS 80 receives an SIP INVITE message requesting for an incoming voice call destined to an ICS subscriber served by itself, i.e., an SIP INVITE message (indicated as "MT voice call request" in FIG. 12) (S12-1).

The SCC AS 80 determines a domain (i.e., PS domain or CS domain) to which a voice call is to be delivered by using a T-ADS function (S12-2). Here, the T-ADS can perform domain selection for voice call delivery with consideration of capabilities of an access network (e.g., whether IMS voice over PS session can be supported), capabilities of the UE, an IMS registration state, a CS domain registration state, user preferences, operator policies, etc. Whether an access network on which the ICS subscriber's UE performed location registration recently can support IMS voice over PS session can be determined by the SCC AS 80 through an HSS 40 (not shown in FIG. 12). The SCC AS 80 having performed the T-ADS function determines to deliver a voice call over PS domain with considering that the UE 10 camps on the E-UTRAN cell which supports IMS voice over PS session. The reason is because the SCC AS 80 can not precisely check whether the UE 10 currently camps on the E-UTRAN cell or the UTRAN cell in an ISR activated state.

An SIP INVITE message for creating a session for a voice call transmitted to the UE 10 by the SCC AS 80 is delivered to a serving gateway (S-GW) 50 via an S-CSCF, a P-CSCF 70 and a P-GW 60 (S12-3).

The S-GW 50 identifies a mobility management node which is serving the UE 10, a receiver of an incoming voice call. Since an ISR feature for the UE 10 is in an activated state, both of the MME 20 and the SGSN 30 are in a service state for the UE 10. Accordingly, the S-GW 50 has to request for paging to both of the MME 20 and the SGSN 30 which are in a service state for the UE 10. That is, the S-GW 50 sends a Downlink Data Notification message to the MME 20 and the SGSN 30 (S12-4).

As a response to the Downlink Data Notification message, the MME 20 and the SGSN 30 respectively send a Downlink Data Notification Ack message to the S-GW 50 (S12-5).

The MME 20 and the SGSN 30 respectively perform paging for the UE 10. That is, the MME 20 sends a paging message to each eNodeB 21 which belongs to a tracking area (s) registered by the UE 10 (S12-6a). And, the SGSN 30 sends a paging message to an RNC 31 (S12-6b).

Each eNodeB 21 having received the paging message from the MME 20 performs paging for the UE 10 (S12-7a). And, the RNC 31 having received the paging message from the SGSN 30 sends the paging message to the UE 10 via a NodeB 32 (S12-7b).

The UE 10 currently camps on the UTRAN cell (RA2 of FIG. 10). Accordingly, the UE 10 responds to the UTRAN with respect to the paging performed by the SGSN 30. More concretely, the UE 10 sets-up a user plane as a path via the UTRAN, by performing a service request procedure (S12-8). Details about the service request procedure have been defined in clause 6.12.1 (MS Initiated Service Request Procedure Using Gn/Gp) and clause 6.12.1A (UE Initiated Service Request Procedure Using S4) of 3GPP TS 23.060 v9.3.0.

The S-GW 50 sends an SIP INVITE message to the UE 10 through the SGSN 30. That is, the SIP INVITE message is delivered to the UE 10 from the S-GW 50 via the SGSN 30, the RNC 31 and the NodeB 32, sequentially (S12-9).

Since the UTRAN on which the UE 10 currently camps on does not support IMS voice over PS session, the UE 10 having received the SIP INVITE message sends, to the SCC AS 80, an SIP Response message (i.e., 488 Not Acceptable Here) indicating rejection against request for SIP session creation for a voice call (S12-10).

The above procedures S12-2~S12-10 represent a series of procedures for delivering an incoming voice call to the UE 10 over PS domain. The UE 10 cannot receive the IMS voice call over PS domain through the procedures of S12-2~S12-10. Accordingly, the UE 10 has to receive a voice call over CS domain. S12-11~S12-15 in FIG. 12 represent procedures for delivering an incoming voice call of S12-1 to the UE 10 by changing the domain for the delivery of the voice call into CS domain.

More concretely, the SCC AS 80 having received the rejection message against request for SIP session creation from the UE 10 through S12-10 performs the T-ADS function again so as to deliver the incoming voice call of S12-1 (S12-11). Accordingly, the SCC AS 80 checks that the UE 10 cannot receive a voice call over PS domain. Then, the SCC AS 80 having performed the T-ADS function determines to deliver the voice call over CS domain.

The SIP INVITE message for creating a session for a voice call delivered to the UE 10 by the SCC AS 80 is delivered to the MSC server 90 via the S-CSCF and P-CSCF 70 (S12-12). The MSC server 90 can perform interworking between SIP messages and CS messages as an enhanced MSC server for providing ICS functions.

The MSC server 90 sends a paging message to the UE 10 over CS domain so as to deliver the incoming voice call (S12-13). The paging message of S12-13 is delivered to the UE 10 via the RNC 31 and the NodeB 32.

The UE 10 responds to the paging by the MSC server 90 (S12-14). As the MSC server 90 sends a CS Call Setup message to the UE 10 (S12-15), the UE 10 can successfully receive the incoming voice call of S12-11 (not shown in FIG. 12).

If the UE 10 receives a paging message from the MME 20 (S12-6*a* and S12-7*a*) and the SIP INVITE message of S12-9 while initially camping on the E-UTRAN cell belonging to the TA4 not on the UTRAN cell (here, the SIP INVITE message is delivered through the E-UTRAN), the UE 10 can successfully receive the incoming voice call of S12-1 delivered over the PS domain. Accordingly, the UE 10's response is indicated as an SIP 200 OK instead of the SIP Response message of S12-10 (i.e., 488 Not Acceptable Here), and procedures for delivering an MT voice call over CS domain (i.e., S12-11~S12-15) are not required.

As shown in FIGS. 11 and 12, when an ISR feature is activated in an IMS environment where heterogeneous mobile communications networks (e.g., E-UTRAN and UTRAN/GERAN) interwork with each other, a specific network (e.g., UTRAN/GERAN of FIG. 9, E-UTRAN of FIG. 10) may not support a voice call over PS domain to the UE 10. Especially, in case of intra-SGSN mobility of FIGS. 9 and 11 in which the UE 10 camps on the second cell (which does not support IMS voice over PS session) after moving out from the first cell (which supports IMS voice over PS session) where both cells are served by the same SGSN, voice call over PS domain is not supported in the second cell. And, in case of intra-MME mobility of FIGS. 10 and 12 in which the UE 10 camps on the second cell (which supports IMS voice over PS session) after moving out from the first cell (which does not support IMS voice over PS session) where both cells are served by the same MME, voice call over PS domain is not supported in the first cell.

In this case, the network cannot check whether the UE camps on the E-UTRAN where a voice call can be supported over PS domain, or the UTRAN/GERAN where a voice call can not be supported over PS domain. Accordingly, the incoming voice call first delivered to the PS domain may be delivered to the CS domain through a domain switch procedure and vice versa. This may cause call setup delay in the aspect of the network, resulting in call loss and lowering of call reliability.

In order to overcome the problems occurring in FIGS. 11 and 12, the present invention proposes a method for successfully delivering an MT voice call to the UE at a time by the SCC AS with enhanced ISR deactivation.

More concretely, in the present invention, an access domain for delivery of an incoming voice call (i.e., PS domain or CS domain) is precisely selected at a time by informing a precise current location of the UE to the SCC AS. For this, in the present invention, provided is a method for the mobility management node (i.e., MME or SGSN) to determine whether to keep or deactivate an activated ISR feature at the time of an intra-SGSN Routing Area Update procedure or an intra-MME Tracking Area Update procedure, and conditions for deciding to keep or deactivate an activated ISR feature are defined.

The method for determining whether to keep or deactivate an activated ISR feature by a network entity, i.e., the mobility management node (MME or SGSN) will be explained in brief as follows.

①After the UE moves to a second cell for reselection from a first cell, each cell managed by a first network entity, the first network entity determines whether to keep or deactivate an activated ISR feature.

② It is determined whether both of a first network entity (e.g., MME) and a second network entity (e.g., SGSN) support an ISR feature.

③ If both of the first and second network entities support the ISR feature, it is determined whether the UE uses voice over IMS (IMS voice).

④ If the UE uses voice over IMS, it is determined whether the first network entity can support IMS voice over PS session for the reselected second cell is consistent with whether the second network entity can support IMS voice over PS session (i.e., whether a new ISR area is a Homogeneous ISR area). If only one of the first and second network entities supports IMS voice over PS session (i.e., If a new ISR area is a Non-homogeneous ISR area), it is determined to deactivate an activated ISR feature.

⑤ When an activated ISR feature has been deactivated, the UE has to perform location registration whenever cell reselection is executed. The network is provided with the UE's location (E-UTRAN or GERAN/UTRAN), and delivers an incoming voice call to the UE over a precisely selected domain at a time, by using information on whether the network on which the UE currently camps supports IMS voice over PS session.

Hereinafter, will be explained conditions considered when deciding to activate or deactivate an ISR feature by the network entity according to the present invention.

1) A condition about whether the UE uses voice over IMS: This condition may be determined by at least one of the following conditions. The following conditions may be acquired from the mobility management node itself, the UE, or another node of the network. Concrete conditions are as follows.

whether a user is an ICS subscriber;
 whether the UE has registered on an IMS network for voice;
 domain preference for the UE's voice;
 whether an access network currently location-registered can support IMS voice over PS session;
 the UE's capabilities relating to voice;
 whether a serving network can support CSFB (CS Fall-Back).

2) A condition about whether an access network on which the UE previously performed location registration (first network entity) can support IMS voice over PS session, and whether an access network on which the UE currently performs location registration (second network entity) can support IMS voice over PS session are consistent with each other. Here, when both of the previously location-registered access network and the currently location-registered access network support IMS voice over PS session, or both of them do not support the IMS voice over PS session, it is defined as a homogeneous ISR area. The homogeneous ISR area may be determined into the following two types according to a subject of a network.

The MME decides to activate an ISR feature in the following cases. An access network on which the UE previously performed location registration is UTRAN/GERAN, and an access network on which the UE currently performs location registration is E-UTRAN. It is determined whether the UTRAN/GERAN can support IMS voice over PS session is consistent with whether the E-UTRAN can support IMS voice over PS session.

The SGSN decides for ISR activation in the following cases. An access network on which the UE previously performed location registration is E-UTRAN, and an access network on which the UE currently performs location registration is UTRAN/GERAN. It is determined whether the E-UTRAN can support IMS voice over PS session is consistent with whether the UTRAN/GERAN can support IMS voice over PS session.

Hereinafter, will be explained the method for determining whether access networks belong to a homogeneous ISR area by the mobility management node (i.e., MME or SGSN). As aforementioned, the homogeneous ISR area is determined by checking whether an access network on which the UE previously performed location registration (e.g., E-UTRAN or UTRAN/GERAN) can support IMS voice over PS session, and whether an access network on which the UE currently performs location registration (e.g., E-UTRAN or UTRAN/GERAN) can support IMS voice over PS session are consistent with each other. Examples of the determination are shown as follows:

1) One mobility management node compares information included in a Context Response message received from another mobility management node (e.g., SGSN in case of MME, and MME in case of SGSN), and indicating whether said another mobility management node can support IMS voice over PS session, with information indicating whether itself can support IMS voice over PS session. If the mobility management nodes differently support IMS voice over PS session with respect to each UE, a value related to support of IMS voice over PS session set for each UE has to be stored in a UE context. For instance, the MME stores the value which may be defined as a parameter in MM and EPS bearer Contexts, and the SGSN stores the value which may be defined as a parameter in MM and PDP/EPS Bearer Contexts. Then, when one mobility management node sends a Context Response message to another mobility management node, the stored value (e.g., a corresponding parameter including the value) is sent together. Details about MM and EPS Bearer Contexts information on the UE kept by the MME have been defined in clause 5.7.2 (MME) of 3GPP TS 23.401 v9.3.0, and details about MM and PDP/EPS Bearer Contexts information on the UE kept by the SGSN have been defined in clause 13.2.3 (Context fields for one MS) of 3GPP TS 23.060 v9.3.0. Therefore, additional detailed explanations thereof will not be repeated.

2) One mobility management node may send a value related to support of IMS voice over PS session to another mobility management node (e.g., SGSN in case of MME, and MME in case of SGSN), through a new message defined in the present invention, or through the existing message delivered to said another mobility management node, not through a context response message. One mobility management node stores therein a value received from another mobility management node, and utilizes the value when necessary.

3) One mobility management node may pre-store information on whether another mobility management node (e.g., SGSN in case of MME, and MME in case of SGSN) can support IMS voice over PS session (e.g., through setup about the mobility management nodes when configuring a network), thereby comparing whether another mobility management node can support IMS voice over PS session with whether itself can support IMS voice over PS session.

As aforementioned, in the present invention, whether to keep or deactivate an activated ISR feature is decided based on, not only whether the MME and the SGSN can support the ISR feature (S6-16 in FIG. 6 in case of intra-SGSN mobility, and S7-18 in FIG. 7 in case of intra-MME mobility), but also two additional conditions, i.e., whether the UE uses voice over IMS, and whether the MME and the SGSN can support voice over IMS over PS session (i.e., a value related to support of IMS voice over PS session) in case of intra-SGSN mobility and intra-MME mobility.

In the present invention, it is assumed that an ISR feature for the UE has been activated in the network. Accordingly, whether to keep or deactivate an activated ISR feature may be decided based on not only the two additional conditions (i.e., whether the UE uses IMS voice, and whether each mobility management node (MME or SGSN) can support IMS voice over PS session on a corresponding ISR area when the UE camps on the second cell after moving from the first cell, each cell served by the same mobility management node), but also the following conditions. In some cases, even if the two additional conditions do not satisfy the ISR deactivation, the ISR deactivation may be performed by the following conditions. On the contrary, even if the two additional conditions satisfy the ISR deactivation, the ISR deactivation may not be performed by the following conditions:

HPLMN (Home Public Land Mobile Network) flag: A flag indicating preference about an ISR feature set by a Home PLMN. The flag may be variously set, e.g., one flag per PLMN or one flag per subscriber, thereby keeping or deactivating an activated ISR feature.

A policy and a configuration of a serving network: Activation or deactivation of an ISR feature may be possible according to an ISR-related policy and a configuration of a network where a UE is located.

Figure 13:
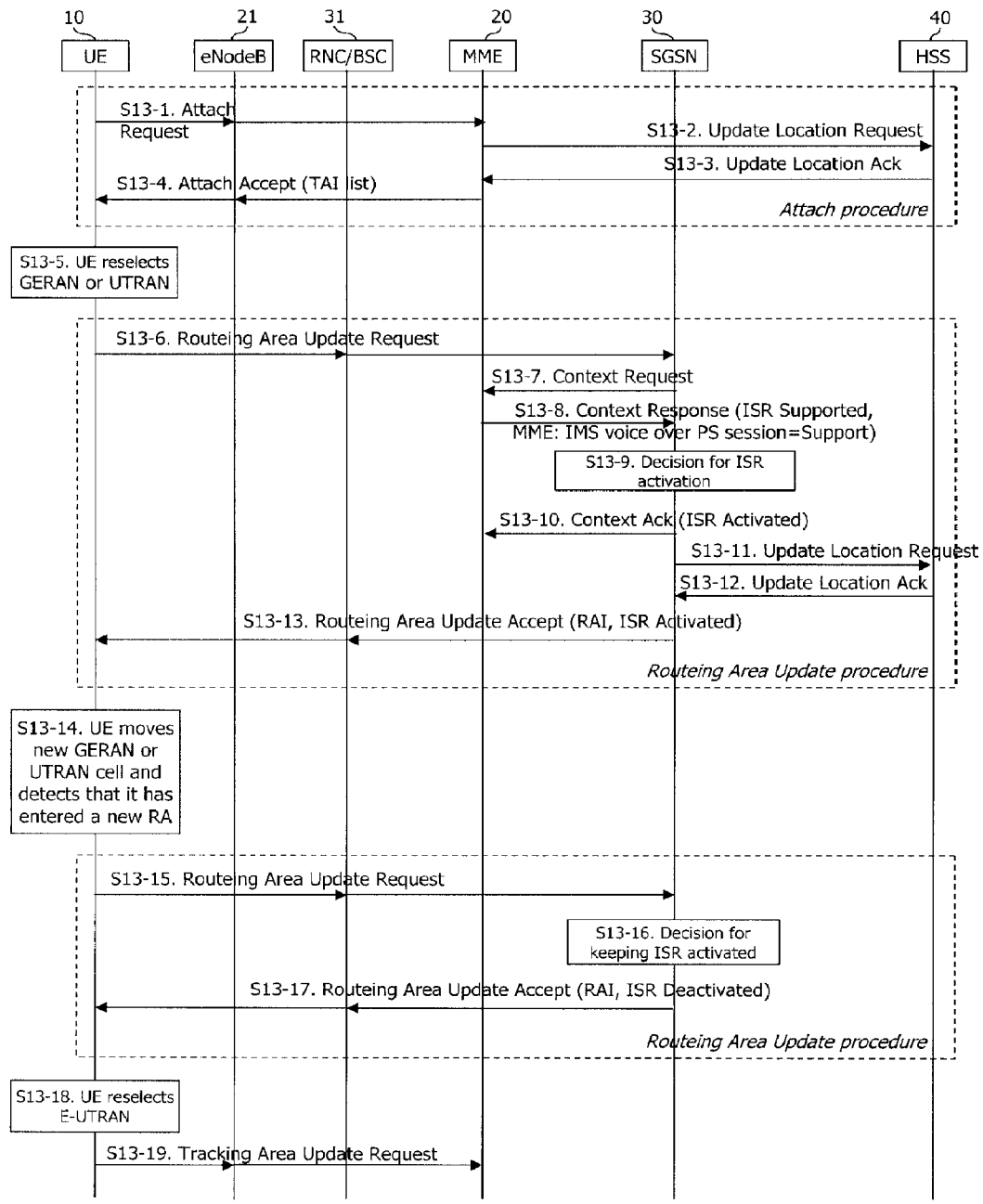
FIG. 13 shows a method for determining ISR activation or ISR deactivation for a UE in case of intra-SGSN mobility according to a first embodiment of the present invention.
Figure 14:
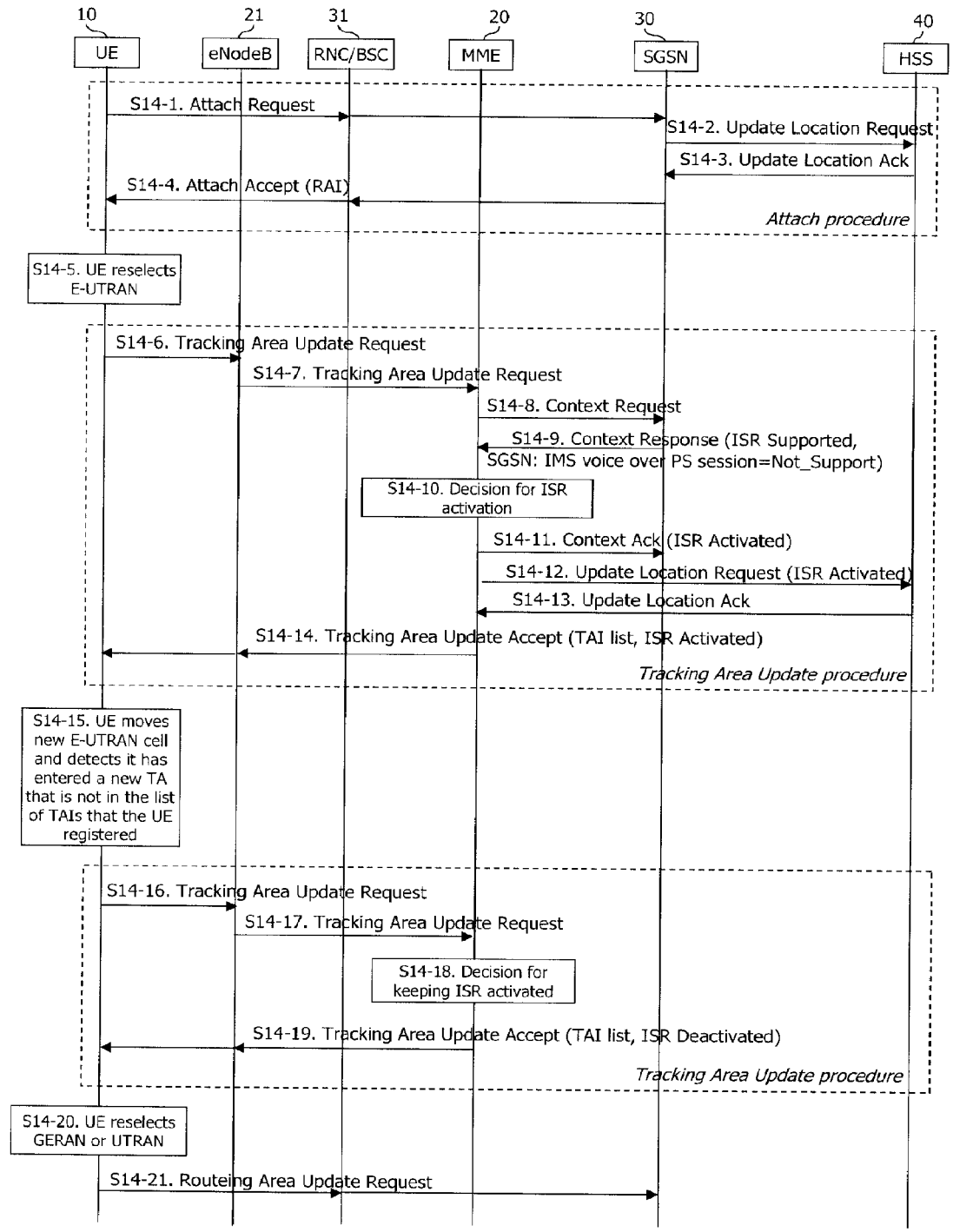
FIG. 14 shows a method for determining ISR activation or ISR deactivation for a UE in case of intra-MME mobility according to a second embodiment of the present invention.

FIG. 13 shows a method for determining ISR activation or ISR deactivation for a UE in case of intra-SGSN mobility according to a first embodiment of the present invention, and FIG. 14 shows a method for determining ISR activation or ISR deactivation for a UE in case of intra-MME mobility according to a second embodiment of the present invention.

In FIG. 13, the UE initially performs location registration on the E-UTRAN (i.e., Attach procedure) (S13-1~S13-4), moves to perform location registration on the first cell (served by the SGSN) of the UTRAN (or GERAN) (S13-5~S13-13), and then camps on the second cell (served by the same SGSN) of the UTRAN (or GERAN) (S13-14~S13-17). In case of the conventional intra-SGSN mobility, when the UE camps on the second cell after moving out from the first cell where both cells are served by same SGSN, an activated ISR feature for the UE is kept without considering whether IMS voice over PS session can be supported in the second cell. On the other hand, in case of intra-SGSN mobility according to the first embodiment of FIG. 13, it is determined to keep or deactivate an activated ISR feature by checking whether a new ISR area to which the cell the UE has moved into belongs is a homogeneous ISR area (S13-15~S13-17). Hereinafter, a method for determining ISR deactivation in case of intra-SGSN mobility according to the present invention will be explained with reference to FIG. 13.

The first embodiment of the present invention will be explained with reference to FIG. 13.

FIG. 13 is implemented with the following assumptions.

1) The UE uses voice over IMS;

2) As the UE 10 moves to another GERAN or UTRAN cell ('second cell') from one

GERAN or UTRAN cell ('first cell'), the UE performs location registration on the SGSN. Here, the previously location-registered SGSN and the newly location-registered SGSN are same (i.e., intra-SGSN mobility);

3) The E-UTRAN and the GERAN or UTRAN (first cell) reselected as the UE has moved from the E-UTRAN support IMS voice over PS session, whereas the GERAN or UTRAN (second cell) on which the UE camps on in case of intra-SGSN mobility does not support IMS voice over PS session. Here, it is assumed that both of the MME and the SGSN support an ISR feature. In FIG. 13, the mobility management node (SGSN) determines whether a previously location-registered access network can support IMS voice over PS session is consistent with whether a currently location-registered access network can support IMS voice over PS session (whether the access networks belong to a homogeneous ISR area), by acquiring information on whether another mobility management node can support IMS voice over PS session through a Context Response message.

In FIG. 13, it is assumed that the UE initially camps on the E-UTRAN to perform an attach procedure (S13-1~S13-4), moves to camp on the GERAN or UTRAN (first cell of the SGSN) (S13-5), and then camps on another GERAN or UTRAN (second cell of the SGSN) (S13-14).

FIG. 13 shows a series of processes consisting of Attach procedures to the network by the UE (S13-1~S13-4), first Routing Area Update procedures (S13-6~S13-13), and second Routing Area Update procedures (S13-15~S13-17).

Referring to FIG. 13, once the UE 10 has camped on the E-UTRAN cell, the UE 10 sends an Attach Request message to the MME 20 for location registration on the HSS 40 through the eNodeB 21 (S13-1). The MME 20 sends an Update Location Request message to the HSS 40 so as to inform the UE's attachment (S13-2).

As a response to the Update Location Request message, the HSS 40 stores an identity (ID) of the MME 20 to which the UE 10 has attached, and sends an Update Location Ack message including the UE's subscriber information to the MME 20 (S13-3). The MME 20 sends an Attach Accept message to the UE 10 through the eNodeB 21 (S13-4). The Attach Accept message includes a TAI (Tracking Area Identity) list. Through S13-1~S13-4, the UE 10 attaches to the MME 20 of the E-UTRAN cell.

Then, the UE 10 moves to the GERAN or UTRAN cell (first cell) and camps on the cell, thereby reselecting the GERAN or UTRAN cell (S13-5). This requires Routing Area Update procedures by the UE 10 (S13-6~S13-13).

More concretely, the UE 10 sends a Routing Area Update Request message to the SGSN 30 so as to perform location registration on the HSS 40 through the RNC/BSC 31 (S13-6). The Routing Area Update Request message includes information indicating that the UE 10 has performed location registration on the MME 20. Accordingly, through the Routing Area Update Request message, the SGSN 30 can recognize that the UE 10 has performed location registration on the MME 20. The SGSN 30 sends a Context Request message to the MME 20 so as to receive context information on the UE 10 from the previously location-registered MME 20 (S13-7).

As a response to the Context Request message sent from the SGSN 30, the MME 20 sends a Context Response message to the SGSN 30 (S13-8). Here, the MME 20 includes a parameter indicating that the MME 20 can support an ISR feature (which is indicated as "ISR Supported" in FIG. 13) in the Context Response message so as to inform the SGSN 30. Also, the MME 20 includes, in the Context Response message, a parameter indicating that the MME 20 can support IMS voice over PS session for the UE 10 (which is indicated as "MME: IMS voice over PS session=Support" in FIG. 13) so as to inform the SGSN 30. The SGSN 30 stores the value received from the MME 20 (i.e., the parameter indicating that the MME 20 can support IMS voice over PS session for the UE 10) in a UE context, i.e., MM and PDP/EPS Bearer Contexts. Here, the MME 20 can inform the SGSN 30 that it can support IMS voice over PS session for the UE 10 by the following methods. For instance, the parameter indicating that the MME 20 can support IMS voice over PS session may not be included in the Context Response message. Alternatively, the parameter may be included in the Context Response message with a value set as 'Support' or 'Positive'. S13-8 of FIG. 13 shows that the Context Response message includes a parameter indicating that the MME 20 can support IMS voice over PS session with a value set as 'Support'.

The SGSN 30 decides to activate or deactivate an ISR feature for the UE 10 based on the parameters (S13-9). More concretely, the 'ISR Supported' parameter included in the Context Response message received from the MME 20 indicates that the MME 20 can support an ISR feature and the SGSN 30 can also support an ISR feature. As a result, the SGSN 30 decides ISR activation. By the ISR activation determined in S13-9, the UE does not have to register its location on the network whenever moving to the GERAN or UTRAN cell (first cell) from the E-UTRAN cell, or to the E-UTRAN from the GERAN or UTRAN cell.

As a response to the Context Response message sent from the MME 20, the SGSN 30 sends a Context Ack message to the MME 20 (S13-10). Here, the Context Ack message includes information on decision for ISR activation. Accordingly, the SGSN 30 informs ISR activation to the MME 20 through the Context Ack messages. For instance, the ISR activation may be indicated by including an 'ISR Activated parameter' in the Context Ack message, or by including an 'ISR Activated parameter' in the Context Ack message with a value set as '1' or 'Positive', or by not including an 'ISR Activated parameter' in the Context Ack message. S13-10 of FIG. 13 shows the Context Ack message including an 'ISR Activated parameter'.

The SGSN 30 sends an Update Location Request message to the HSS 40 so as to inform the UE's location registration (S13-11). Here, the SGSN 30 having decided for ISR activation sends the Update Location Request message to the HSS 40 with information indicating ISR activation. For instance, the ISR activation may be indicated by the methods aforementioned in S13-10.

The HSS 40 stores an identity (ID) of the SGSN 30 on which the UE 10 has performed Routing Area Update, and sends an Update Location Ack message including the UE's subscriber information to the SGSN 30 (S13-12).

As a response to the Routing Area Update Request message of S13-6, the SGSN 30 sends a Routing Area Update Accept message to the UE 10 (S13-13). Here, the SGSN 30 having decided for ISR activation sends the Routing Area Update Accept message to the UE 10 with information indicating ISR activation. For instance, the ISR activation in S13-13 may be informed by the methods aforementioned in S13-10. The Routing Area Update Accept message includes a RAI.

After performing the Routing Area Update procedure, the UE 10 may move to a new GERAN or UTRAN cell (i.e., second cell of the SGSN, which corresponds to the RA2 in FIG. 9). Since a routing area (the RA2 in FIG. 9) to which the newly camped GERAN or UTRAN cell belongs is different from the previously location-registered RA (the RA1 in FIG. 9), the UE 10 performs location registration. Here, the UE 10 reselects the newly camped GERAN or UTRAN cell (i.e., second cell of the SGSN, which corresponds to the RA2 in FIG. 9) (S13-14).

The UE 10 sends a Routing Area Update Request message to the SGSN 30 through the RNC/BSC 31 so as to perform location registration on the HSS 40 through the SGSN 30 (S13-15). Here, the UE 10 includes an 'old RAI (Routing Area Identity)' in the Routing Area Update Request message.

The SGSN 30 determines whether to keep or deactivate an activated ISR feature for the UE 10 (S13-16). Here, the UE 10 performs location registration on the same SGSN 30 as the previous SGSN 30. Accordingly, in order to decide to keep an activated ISR feature, the SGSN 30 additionally determines whether the UE 10 uses voice over IMS, and whether a new ISR area is a homogeneous ISR area. Here, the UE 10 is a user equipment using voice over IMS as assumed in FIG. 13. Accordingly, whether a new ISR area is a homogeneous ISR area is determined. According to the parameter included in the Context Response message of S13-8 (i.e., MME: IMS voice over PS session=Support in FIG. 13), the E-UTRAN supports IMS voice over PS session. However, the newly camped GERAN or UTRAN (the RA2 in FIG. 9) does not support IMS voice over PS session. Accordingly, the new ISR area to which the E-UTRAN and the GERAN or UTRAN belong is not a homogeneous ISR area. As a result, the MME 20 finally decides to deactivate an ISR feature.

Conditions for deciding to deactivate an activated ISR feature by the SGSN 30 will be explained as follows:

1) It is determined that the Routing Area Update Request message received in S13-15 corresponds to intra-SGSN RAU (Routing Area Update) (i.e., location registration procedure). If the Routing Area Update Request message does not correspond to intra-SGSN RAU, an activated ISR feature is deactivated;

2) On the other hand, if the Routing Area Update Request message corresponds to intra-SGSN RAU, it is determined whether the UE 10 is a user equipment using voice over IMS. If the UE 10 does not use voice over IMS, an activated ISR feature is kept;

3) If the UE 10 uses voice over IMS, it is determined whether a new ISR area resulting from the UE's camping on the new cell is a homogeneous ISR area. If the new ISR area is a homogeneous ISR area, an activated ISR feature is kept. On the other hand, if the new ISR area is not a homogeneous ISR area, an activated ISR feature is deactivated.

Decision to keep or deactivate an activated ISR feature for the UE 10 (S13-16) is performed by determining whether the new ISR area is a homogeneous area, based on a parameter indicating whether the mobility management node (SGSN or MME) can support IMS voice over PS session (e.g., "MME: IMS voice over PS session=Support"), and a parameter indicating whether IMS voice over PS session can be supported with respect to a newly-camped GERAN or UTRAN (e.g., 'SGSN: IMS voice over PS session=Not_Support'). As another embodiment, whether to keep or deactivate an activated ISR feature may be determined by comparing a new RAI on which the UE currently camps (i.e., RA2 in FIG. 9) with an old RAI by using the (old) RAI (Routing Area Identity) parameter of S13-15. More concretely, if an ISR feature is activated only in a homogeneous ISR area, whether to keep or deactivate an activated ISR feature may be determined by comparing whether IMS voice over PS session is supported in a new RA with whether IMS voice over PS session is supported in an old RA.

The Routing Area Update Accept message transmitted to the UE 10 from the SGSN 30 is delivered to the UE 10 through the RNC/BSC 31 (S13-17). Here, the SGSN 30 having decided for ISR deactivation sends the Routing Area Update Accept message to the UE 10 with information indicating ISR deactivation. Here, the ISR deactivation may be indicated by including no 'ISR Activated parameter' in the Routing Area Update Accept message, or by including an 'ISR Activated parameter' in the Routing Area Update Accept message with a value set as '0', or by including an 'ISR Deactivated parameter' in the Routing Area Update Accept message. The Routing Area Update Accept message includes a Routing Area Identity (RAI).

The 'ISR Deactivated' parameter included in the Routing Area Update Accept message in S13-17 is illustrated merely to inform ISR-related decision. Here, the ISR-related decision may be analogized through another message transmitted to the UE.

The UE 10 camps on the E-UTRAN again from the GERAN or UTRAN on which the UE 10 previously camped in S13-14 (S13-18). Here, an ISR feature for the UE 10 has not been activated, therefore, the UE 10 has to perform location registration on the MME 20.

For location registration, the UE 10 sends a Tracking Area Update Request message to the MME 20 through the eNodeB 21 (S13-19).

Whenever the UE 10 reselects the E-UTRAN where IMS voice is supported over PS session and the GERAN or UTRAN where IMS voice is not supported over PS session, the UE 10 performs location registration. This may allow the SCC AS 80 to acquire, through the HSS 40, information on the access network on which the UE 10 has recently performed location registration and whether this access network supports IMS voice over PS session. Based on this information, the SCC AS 80 selects a PS domain for delivery of an MT voice call when the UE 10 camps on the E-UTRAN, and selects a CS domain for delivery of an MT voice call when the UE 10 camps on the GERAN or UTRAN. This may allow the SCC AS 80 to successfully deliver an MT voice call through a first trial.

Once the SGSN 30 has decided for ISR deactivation in S13-16, the following operations may additionally occur.

Between S13-16 and S13-17, may be performed message exchanges between the SGSN 30 and the S-GW 50 (not shown in FIG. 13) so that bearer resources for the UE 10 can be deleted by the MME 20 related to the SGSN 30 with respect to ISR. Here, messages to be exchanged may be a Modify Bearer Request message and a Modify Bearer Response message. Alternatively, new messages defined for the operation, or the existing messages may be used.

Between S13-16 and S13-17, may be performed message exchanges between the SGSN 30 and the HSS 40 so that ISR deactivation for the UE 10 can be informed to the HSS 40. Here, messages to be exchanged may be a Notify Request message and a Notify Response message. Alternatively, new messages defined for the operation, or the existing messages may be used.

Hereinafter, will be explained a method for deactivating an activated ISR feature by a mobility management node (SGSN in FIG. 13, and MME in FIG. 14) when the UE using voice over IMS performs location registration due to intra-SGSN mobility (i.e., Routing Area Update), and procedures for successfully transmitting a call to the UE at one time by delivering an MT voice call to a selected domain (PS domain or CS domain) by the IMS network.

1) When both of the E-UTRAN and the UTRAN/GERAN support IMS voice over PS session (i.e., when the mobility management node determines the access networks to belong to a homogenous ISR area), an activated ISR feature is kept through the procedures of FIG. 13. Here, an MT voice call incoming to the UE 10 is delivered as follows.

When the UE camps on the E-UTRAN cell, the IMS network successfully delivers an MT voice call over PS domain to the UE;

When the UE camps on the UTRAN or GERAN cell, the IMS network successfully delivers an MT voice call over PS domain to the UE;

2) When both of the E-UTRAN and the UTRAN/GERAN do not support IMS voice over PS session (i.e., when the mobility management node determines the access networks to belong to a homogenous ISR area), an activated ISR feature is kept through the procedures of FIG. 13. Here, an MT voice call incoming to the UE 10 is delivered as follows.

When the UE camps on the E-UTRAN cell, the IMS network successfully delivers an MT voice call over CS domain to the UE. Here, a CS FallBack service is used;

When the UE camps on the UTRAN or GERAN cell, the IMS network successfully delivers an MT voice call over CS domain to the UE.

3) When the E-UTRAN supports IMS voice over PS session but the UTRAN or GERAN does not support IMS voice over PS session (i.e., when the mobility management node determines the access networks to belong to a non-homogenous ISR area), an activated ISR feature is deactivated through the procedures of FIG. 13. Here, an MT voice call incoming to the UE 10 is delivered as follows.

When the UE camps on the E-UTRAN cell, the IMS network successfully delivers an MT voice call over PS domain to the UE;

When the UE camps on the UTRAN or GERAN cell, the IMS network successfully delivers an MT voice call over CS domain to the UE.

4) When the E-UTRAN does not support IMS voice over PS session but the UTRAN or GERAN supports IMS voice over PS session (i.e., when the mobility management node determines the access networks to belong to a non-homogenous ISR area), an activated ISR feature is deactivated through the procedures of FIG. 13. Here, an MT voice call incoming to the UE 10 is delivered as follows.

When the UE camps on the E-UTRAN cell, the IMS network successfully delivers an MT voice call over CS domain to the UE. Here, a CS FallBack service is used;

When the UE camps on the UTRAN or GERAN cell, the IMS network successfully delivers an MT voice call over PS domain to the UE.

The second embodiment of the present invention will be explained with reference to FIG. 14.

FIG. 14 is implemented with the following assumptions.

1) The UE uses voice over IMS;

2) As the UE 10 moves to another E-UTRAN cell ('second cell') from one E-UTRAN cell ('first cell'), the UE performs location registration on the MME. Here, the previously location-registered MME and the newly location-registered MME are same (i.e., intra-MME mobility);

3) There is no change of the Serving GW by the UE's intra-MME mobility;

4) The GERAN or UTRAN and the E-UTRAN cell (first cell) reselected as the UE has moved from the GERAN or UTRAN do not support IMS voice over PS session, whereas the E-UTRAN cell (second cell) on which the UE camps due to intra-MME mobility supports IMS voice over PS session.

The first embodiment of FIG. 13 relates to intra-SGSN mobility, and the technical concepts of the present invention explained with reference to FIG. 13 can be applied to the second embodiment of FIG. 14 which relates to intra-MME mobility. In the second embodiment of FIG. 14, the UE initially camps on the GERAN or UTRAN cell, and performs location registration. Then, the UE reselects one E-UTRAN cell (one of cells included in the TAI list 1 in FIG. 10) to which the UE has moved to camp thereon, and performs location registration. Then, the UE reselects another E-UTRAN cell (one of cells included in the TAI list 2 in FIG. 10) to which the UE has moved to camp thereon, and performs location registration.

In this case, the UE 10 initially camps on the UTRAN. Accordingly, the UE 10 performs an attach procedure through the SGSN 30 not through the MME 20 (S14-1~S14-4) (corresponding to S13-1~S13-4 of FIG. 13). As the UE 10 moves to camp on the E-UTRAN (i.e., the first cell served by the MME), the UE 10 reselects the E-UTRAN (S14-5) (corresponding to S13-5 of FIG. 13), and performs Tracking Area Update procedures (S14-6~S14-14) (corresponding to S13-6~S13-13 of FIG. 13). Accordingly, the MME 20 decides for ISR activation, and registers the UE's location on the HSS 40. If the UE 10 camps on another E-UTRAN (second cell served by the MME), the UE 10 reselects the E-UTRAN (S14-15) (corresponding to S13-14 of FIG. 13), and performs Tracking Area Update procedures (S14-16~S14-19) (corresponding to S13-15~S13-17 of FIG. 13). Accordingly, the MME 20 decides for ISR deactivation.

Differently from the first embodiment of FIG. 13, a subject which determines ISR activation (S14-10 of FIG. 14) and a subject which determines keeping or deactivation of an activated ISR feature (S14-18 of FIG. 14) are the MME, not the SGSN. In S14-14 and S14-19, a 'TAI list' is included in the Tracking Area Update Accept message (corresponding to RAI in S13-13 and S13-17 of FIG. 13).

For brief explanations of the present invention, an operation and a function of each signalling of FIG. 14 are replaced by those of FIG. 13. Hereinafter, only procedures to determine ISR deactivation in the second embodiment of FIG. 14 will be explained.

After S14-1~S14-8 of FIG. 14 (corresponding to S13-1~S13-8 of FIG. 13) have been performed, the SGSN 30 sends, to the MME 20, a Context Response message as a response to the Context Request message received from the MME 20 (S14-9). Here, the SGSN 30 includes a parameter informing that IMS voice over PS session is not supported to the UE 10 (i.e., SGSN: IMS voice over PS session=Not_Support), in the Context Response message. The MME 20 stores, the parameter received from the SGSN 30 (i.e., SGSN: IMS voice over PS session=Not_Support), in a UE context (i.e., MM and EPS bearer Contexts).

After S14-9 has been performed, S14-10~S14-15 are performed (corresponding to S13-9~S13-14 of FIG. 13). After S14-16 have been performed, the eNodeB 21 determines an MME 20 to which the Tracking Area Update Request message is to be forwarded, based on the RRC parameter received from the UE 10 together with the Tracking Area Update Request message. Then, the eNodeB 21 forwards (transfers or delivers) the Tracking Area Update Request message to the determined MME 20. As assumed in FIG. 14, the MME 20 which serves the new TA (e.g., TA4 included in the TAI list 2 in FIG. 10) to which the UE 10 has entered is the same as the previous MME 20 on which the UE 10 has performed location registration (S14-6 S14-14).

The MME 20 determines to keep or deactivate an activated ISR feature for the UE 10 (S14-18). There is no change of the Serving GW as assumed above and, location registration is performed on the same MME 20 as the previous MME 20. Accordingly, in order to decide to keep an activated ISR feature, the MME 20 additionally determines whether the UE 10 uses voice over IMS, and whether a new ISR area is a homogeneous ISR area. Here, the UE 10 is a user equipment using voice over IMS as assumed above. Accordingly, whether a new ISR area is a homogeneous ISR area is determined. According to the parameter included in the Context Response message of S14-9 (i.e., SGSN: IMS voice over PS session=Not_Support), the UTRAN does not support IMS voice over PS session. However, the newly camped E-UTRAN supports IMS voice over PS session. Accordingly, the new ISR area to which the UTRAN and the E-UTRAN belong is not a homogeneous ISR area. As a result, the MME 20 finally decides to deactivate an activated ISR feature.

Conditions for deciding to deactivate an activated ISR feature by the MME 20 will be explained as follows:

1) It is determined whether the Serving GW has changed or not. If the Serving GW has changed, an activated ISR feature is deactivated;

2) If the Serving GW has not changed, it is determined whether the Tracking Area Update Request message received in S14-16 corresponds to intra-MME TAU (Tracking Area Update) (i.e., location registration procedure). If the Tracking Area Update Request message does not correspond to intra-MME TAU, an activated ISR feature is deactivated;

3) However, if the Tracking Area Update Request message corresponds to intra-MME TAU, it is determined whether the UE 10 uses voice over IMS. If the UE 10 does not use voice over IMS, an activated ISR feature is kept;

4) If the UE 10 uses voice over IMS, it is determined whether a new ISR area resulting from the UE's camping on the new cell is a homogeneous ISR area. If the new ISR area is a homogeneous ISR area, an activated ISR feature is kept. On the other hand, if the new ISR area is not a homogeneous ISR area, an activated ISR feature is deactivated.

The Tracking Area Update Accept message transmitted to the UE 10 from the MME 20 is delivered to the UE 10 through the eNodeB 21 (S14-19). Here, the MME 20 having decided for ISR deactivation sends the Tracking Area Update Accept message to the UE 10 with information indicating ISR deactivation. Here, the ISR deactivation may be indicated by including no 'ISR Activated parameter' in the Tracking Area Update Accept message, or by including an 'ISR Activated parameter' in the Tracking Area Update Accept message with a value set as '0', or by including an 'ISR Deactivated parameter' in the Tracking Area Update Accept message. The Tracking Area Update Accept message includes a TAI (Tracking Area Identity) list.

The UE 10 moves from the E-UTRAN to camp on the GERAN or UTRAN (S14-20). Here, since an ISR feature is not activated, the UE 10 has to perform location registration on the SGSN 30.

For location registration on the SGSN 30 through the RNC/BSC 31, the UE 10 sends a Routing Area Update Request message to the SGSN 30.

In addition, the above various embodiments may be implemented by using, computer software, hardware, or some combination thereof. For instance, the method of the present invention may be stored in a storage medium (e.g., internal memory, flash memory, hard disc, etc.), or may be implemented in codes or commands inside a software program that can be executed by a processor such as a microprocessor inside a UE.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for determining Idle mode Signaling Reduction (ISR) deactivation in a mobile communications system where a first network entity and a second network entity are included and an ISR feature for a user equipment (UE) has been activated, the method comprising:
    (A) receiving, by the first network entity, from the UE, a location registration request message as the UE moves to a second cell from a first cell and reselects the second cell, the first and second cells served by the first network entity;
    (B) deciding, by the first network entity, to keep or deactivate an activated idle mode signaling reduction (ISR) feature based on information on whether IP Multimedia Subsystem (IMS) voice over Packet Switched (PS) session can be supported; and
    (C) sending, by the first network entity, to the UE, a location registration accept message including information on the decision to keep or deactivate an activated ISR feature,
    wherein (B) includes:
    determining whether the first and second network entities support an ISR feature;
    determining whether the UE is a UE using IMS voice (voice over IMS); and
    deciding to activate or deactivate the ISR feature according to whether the first network entity supports IMS voice over PS session for the second cell and whether the second network entity supports IMS voice over PS session.

2. The method of claim 1, further comprising:
    sending, by the first network entity, to the second network entity, a context request message for acquiring information on previous location-registration performed by the UE; and
    receiving, by the first network entity, from the second network entity, a context response message including information on whether IMS voice over PS session can be supported.

3. The method of claim 2, further comprising determining, by the first network entity, whether to activate an ISR feature based on the in-formation on whether an ISR feature can be supported.

4. The method of claim 2, wherein the context response message includes an 'ISR Supported' parameter indicating information on whether the second network can support an ISR feature.

5. The method of claim 2, wherein the context response message includes a parameter indicating information on whether the second network can support an IMS voice over PS domain (PS session).

6. The method of claim 1, wherein in a case that the first and second network entities can support an ISR feature and the UE uses IMS voice, the first network entity decides to keep an activated ISR feature when the first network entity can support IMS voice over PS session for the second cell and the second network entity can support IMS voice over PS session, or when the first network entity does not support IMS voice over PS session for the second cell and the second network entity does not support IMS voice over PS session.

7. The method of claim 1, wherein in a case that the first and second network entities can support an ISR feature and the UE uses IMS voice, the first network entity decides for ISR deactivation when only one of the first and second network entities can support IMS voice over PS session.

8. The method of claim 1, further comprising determining whether a Serving gateway (GW) has changed or not in order to decide to keep or deactivate an activated ISR feature when the first network entity is a mobility management entity (MME).

9. The method of claim 1, wherein the first network entity serving as a mobility management node is a Serving GPRS Support Node (SGSN) of Universal Mobile Telecommunication System (UMTS), which takes charge of Universal Terrestrial Radio Access Network (UTRAN) or GSM/EDGE Radio Access Network (GERAN), and
    wherein the second network entity serving as a mobility management node is a mobility management entity (MME) of Evolved Packet System (EPS), which takes charge of E-UTRAN.

10. The method of claim 1, wherein the first network entity serving as a mobility management node is an MME of EPS, which takes charge of E-UTRAN, and wherein the second network entity serving as a mobility management node is an SGSN of UMTS, which takes charge of UTRAN or GERAN.

11. The method of claim 1, wherein the information on the decision to keep or deactivate an activated ISR feature in step (C) is indicated as an 'ISR Deactivated parameter' or an 'ISR Activated parameter'.

* * * * *